(12) United States Patent
Taylor et al.

(10) Patent No.: US 11,437,886 B2
(45) Date of Patent: Sep. 6, 2022

(54) METHODS AND APPARATUS FOR KINETIC ENERGY HARVESTING

(71) Applicant: Positive Energy, a Gravity and Motion Company, Inc., Watertown, MA (US)

(72) Inventors: Helmut K. Taylor, Gilbert, AZ (US); Steven L. Marden, Boston, MA (US)

(73) Assignee: Positive Energy, a Gravity and Motion Company, Inc., Watertown, MA (US)

( * ) Notice: Subject to any disclaimer, the term of this patent is extended or adjusted under 35 U.S.C. 154(b) by 0 days.

(21) Appl. No.: 17/353,039

(22) Filed: Jun. 21, 2021

(65) Prior Publication Data

US 2021/0313861 A1 Oct. 7, 2021

Related U.S. Application Data

(63) Continuation-in-part of application No. 17/091,713, filed on Nov. 6, 2020, now Pat. No. 11,043,889.
(Continued)

(51) Int. Cl.
| | |
|---|---|
| *H02K 35/00* | (2006.01) |
| *H02K 7/18* | (2006.01) |
| *H02K 7/02* | (2006.01) |
| *H02K 7/116* | (2006.01) |
| *H02K 11/00* | (2016.01) |

(Continued)

(52) U.S. Cl.
CPC .......... *H02K 7/1892* (2013.01); *H02J 7/0042* (2013.01); *H02J 7/02* (2013.01); *H02J 50/10* (2016.02); *H02K 7/02* (2013.01); *H02K 7/116* (2013.01); *H02K 11/0094* (2013.01);
(Continued)

(58) Field of Classification Search
CPC ......... H02K 35/00; H02K 35/02; H02K 35/04
See application file for complete search history.

(56) References Cited

U.S. PATENT DOCUMENTS 2,277,897 A * 3/1942 Alexander .............. F21L 13/06
362/192
4,289,970 A 9/1981 Deibert
(Continued)

FOREIGN PATENT DOCUMENTS

| CN | 102769344 B | 9/2014 |
|---|---|---|
| JP | H1052000 A | 2/1998 |

(Continued)

OTHER PUBLICATIONS

"Energy Vault Enabling a Renewable World," Website: https://energyvault.com/ (2021).
(Continued)

*Primary Examiner* — Dang D Le
(74) *Attorney, Agent, or Firm* — Foley Hoag LLP; Rajesh Vallabh

(57) ABSTRACT

Kinetic energy harvesting devices are disclosed including, but not limited to, portable and stationary devices that generate electricity from motion resulting from any type of movement including human movement, movement of traveling vehicles, gravitational movement, and movement resulting from stored spring energy. The kinetic energy harvesting devices can be used for charging batteries and powering devices such as personal electronic devices and electric vehicles.

14 Claims, 41 Drawing Sheets

Related U.S. Application Data

(60) Provisional application No. 62/931,301, filed on Nov. 6, 2019.

(51) Int. Cl.
| | | |
|---|---|---|
| *H02J 50/10* | (2016.01) | |
| *H02K 35/04* | (2006.01) | |
| *H02N 2/18* | (2006.01) | |
| *H02J 7/02* | (2016.01) | |
| *H02J 7/00* | (2006.01) | |
| *H02K 11/04* | (2016.01) | |

(52) U.S. Cl.
CPC ........... *H02K 11/046* (2013.01); *H02K 35/04* (2013.01); *H02N 2/183* (2013.01)

(56) References Cited

U.S. PATENT DOCUMENTS

| | | | |
|---|---|---|---|
| 4,385,737 A * | 5/1983 | Gulette | B60R 22/44 242/378.4 |
| 4,500,827 A | 2/1985 | Merritt et al. | |
| 5,347,186 A * | 9/1994 | Konotchick | H02K 7/1876 310/17 |
| 5,734,445 A * | 3/1998 | Neill | H02K 7/1853 348/734 |
| 6,189,576 B1 | 2/2001 | Markward | |
| 6,220,719 B1 | 4/2001 | Vetorino et al. | |
| 7,218,018 B2 | 5/2007 | Hasegawa et al. | |
| 7,288,860 B2 | 10/2007 | Cheung et al. | |
| 7,462,970 B2 * | 12/2008 | Hoff | F02N 11/006 310/113 |
| 7,723,880 B2 | 5/2010 | Dai | |
| 8,729,747 B2 | 5/2014 | Arnold et al. | |
| 9,325,232 B1 | 4/2016 | Hunstable | |
| 9,769,558 B2 * | 9/2017 | Chandramohan | H04B 1/3888 |
| 9,948,127 B2 * | 4/2018 | Brink | H02J 7/04 |
| 11,043,889 B2 * | 6/2021 | Taylor | H02K 11/0094 |
| 2005/0218728 A1 | 10/2005 | Stewart et al. | |
| 2008/0217926 A1 | 9/2008 | Lemieux | |
| 2008/0246346 A1 | 10/2008 | Harris et al. | |
| 2009/0066177 A1 | 3/2009 | Loke | |
| 2012/0111650 A1 * | 5/2012 | Czysz | B60K 1/00 180/65.1 |
| 2015/0214823 A1 | 7/2015 | Shastry et al. | |
| 2021/0135557 A1 | 5/2021 | Taylor | |

FOREIGN PATENT DOCUMENTS

| | | |
|---|---|---|
| JP | 2002/233106 A | 8/2002 |
| JP | 2002/365377 A | 12/2002 |
| JP | 2011/236879 A | 11/2011 |
| JP | 2012/034475 A | 2/2012 |
| KR | 101116372 B1 | 3/2012 |
| KR | 101861255 B1 | 5/2018 |
| WO | WO-2005093931 A1 | 10/2005 |
| WO | WO-2011/132212 A2 | 10/2011 |
| WO | WO-2021/092404 A1 | 5/2021 |

OTHER PUBLICATIONS

Cai et al., "Enhanced electromagnetic wrist-worn energy harvester using repulsive magnetic spring," Mechanical Systems and Signal Processing, 150: 107251 (2021).

Cai et al., "Recent Advances in Human Motion Excited Energy Harvesting Systems for Wearables," Energy Technology, 8(10): 2000533 (17 pages)(2020).

Digregorio et al., "Modeling and Experimental Characterization of an Electromagnetic Energy Harvester for Wearable and Biomedical Applications," IEEE Access, 8: 175436-175447 (2020).

Hamid et al., "A wearable energy harvester unit using piezoelectric-electromagnetic hybrid technique," Sensors and Actuators A: Physical, 257: 198-207 (2017).

International Search Report and Written Opinion for International Application No. PT/US2020/059439 dated Mar. 3, 2021.

Khaligh et al., "Kinetic Energy Harvesting Using Piezoelectric and Electromagnetic Technologies—State of the Art," IEEE Transactions of Industrial Electronics, 57(3): 850-860 (2010).

Kulah et al., "Energy Scavenging From Low-Frequency Vibrations by Using Frequency Up-Conversion for Wireless Sensor Applications," IEEE Sensors Journal, 8(3): 261-268 (2008).

Li et al., "Wearable energy harvesters generating electricity from low-frequency human limb movement," Microsystems and Nanoengineering, 4(24): 13 pages (2018).

Lin et al., "A rotational wearable energy harvester for human motion," Proceedings of the 17th IEEE International Conference on Nanotechnology: 22-25 (2017).

Rome et al., "Generating Electricity While Walking with Loads," Science, 309: 20 pages (2005).

Saha et al., "Electromagnetic generator for harvesting energy from human motion," Sensors and Actuators A: Physical, 147: 248-253 (2008).

Salauddin et al., "Design and experiment of human hand motion driven electromagnetic energy harvester using dual Halbach magnet array," Smart Materials and Structures, 26: 035011 (13 pages)(2017).

Schreiber et al. "A multimodal dataset of human gait at different walking speeds established on injury-free adult participants," Sci Data 6, 111 (2019).

Wang et al., "Magnetic-spring based energy harvesting from human motions: Design, modeling and experiments," Energy Conversion and Management, 132: 189-197 (2017).

Zhang et al., "Design of high-efficiency electromagnetic energy harvester based on a rolling magnet," Energy and Conversion and Management, 185: 202-210 (2019).

* cited by examiner

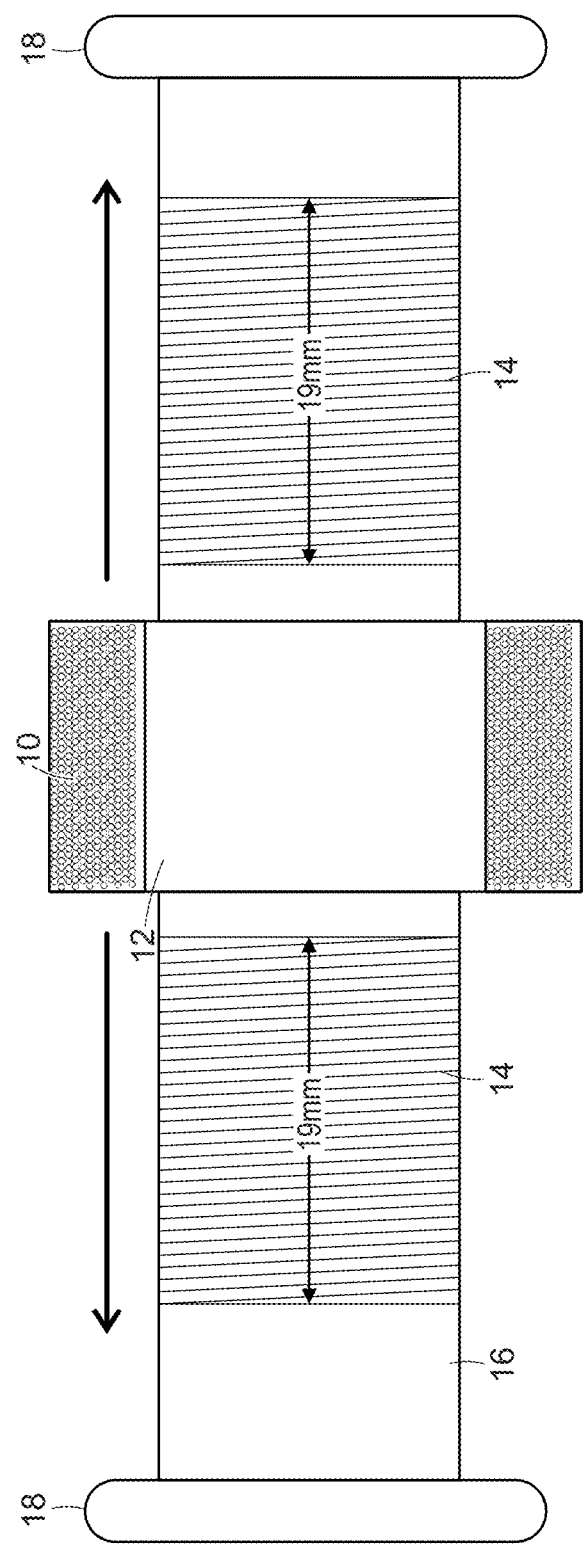

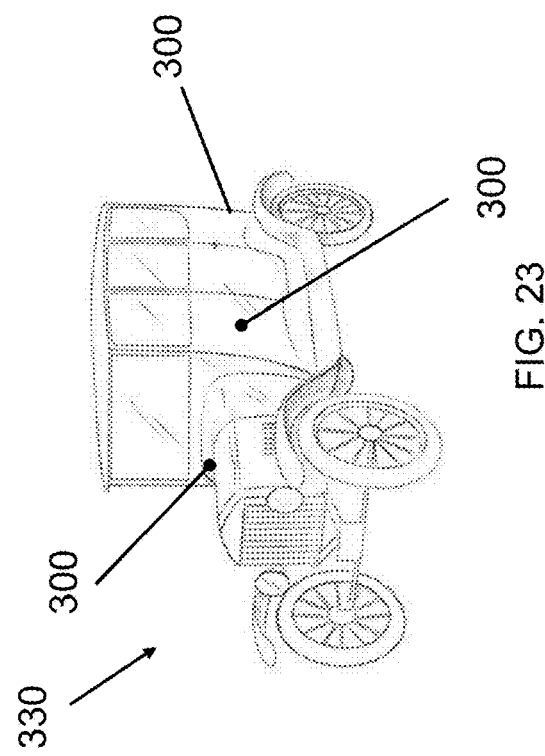
FIG. 23
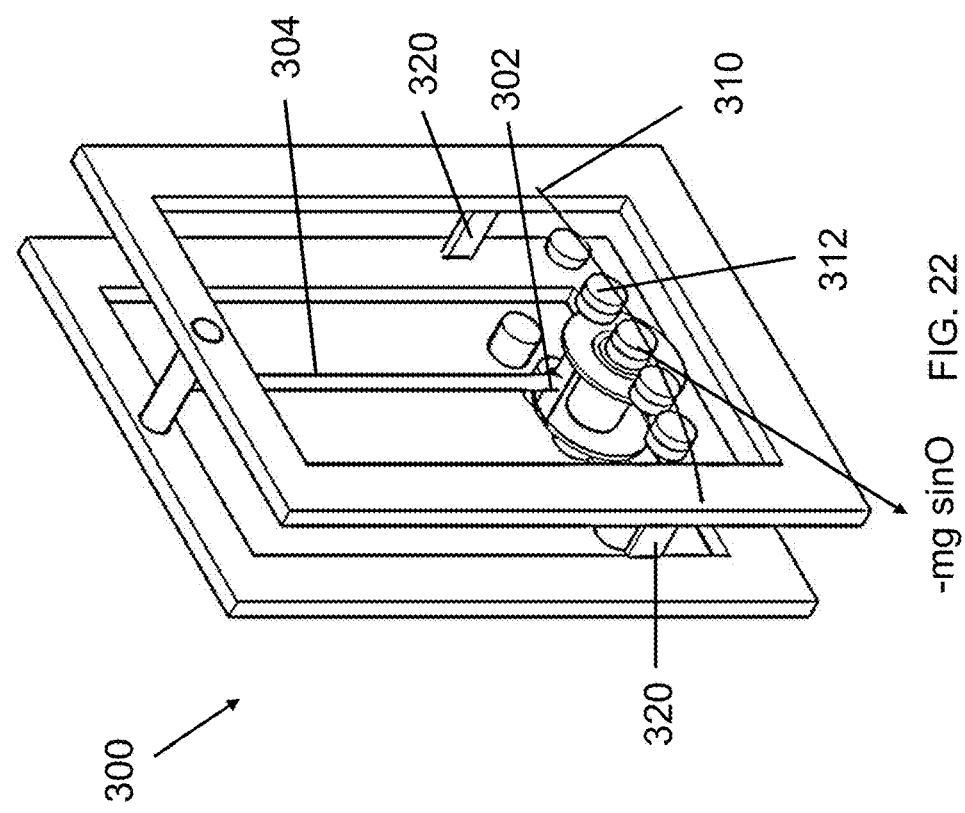
−mg sinΘ  FIG. 22

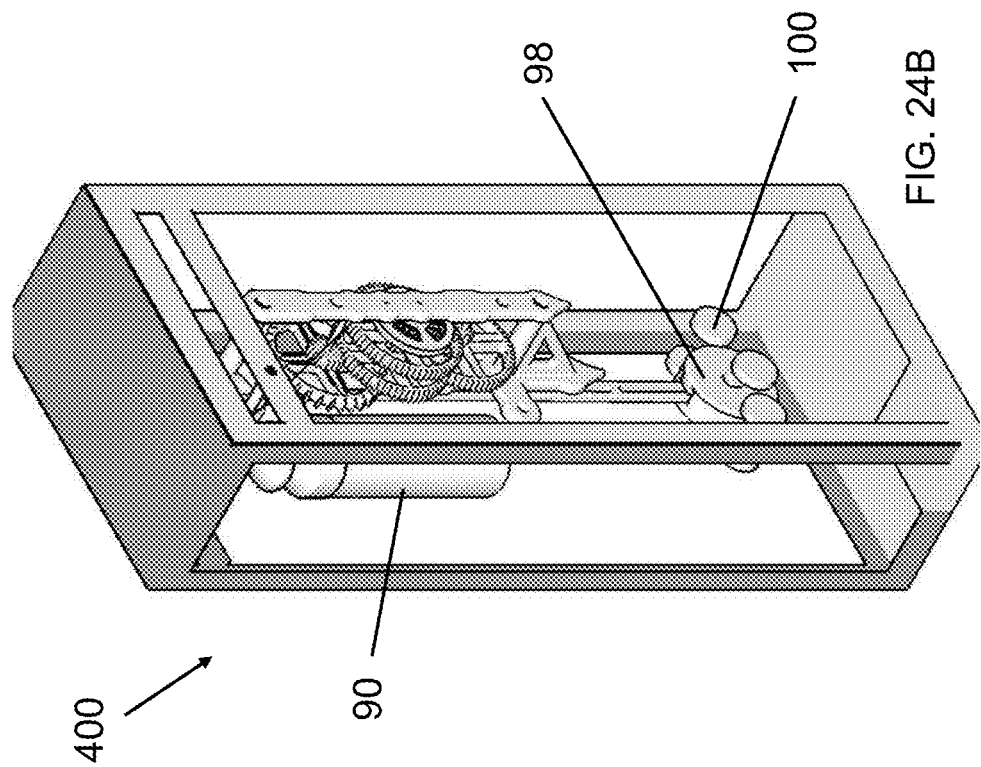
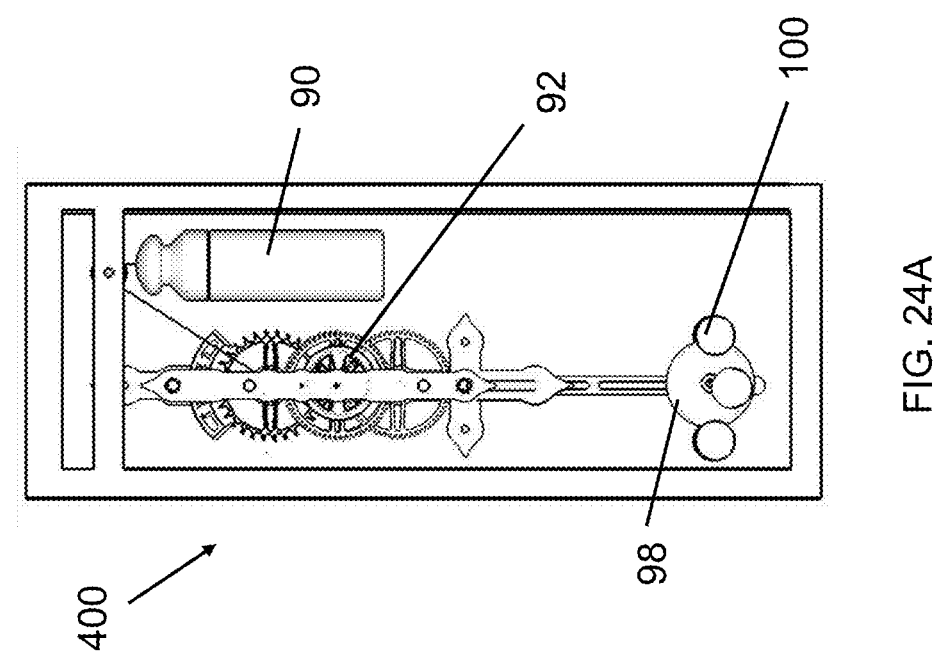

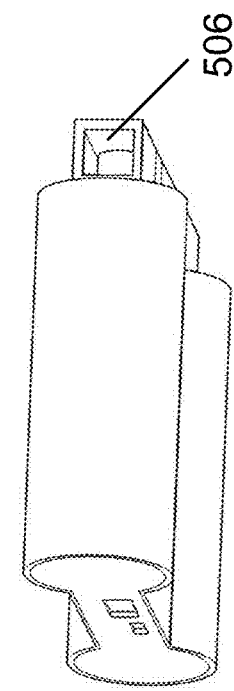
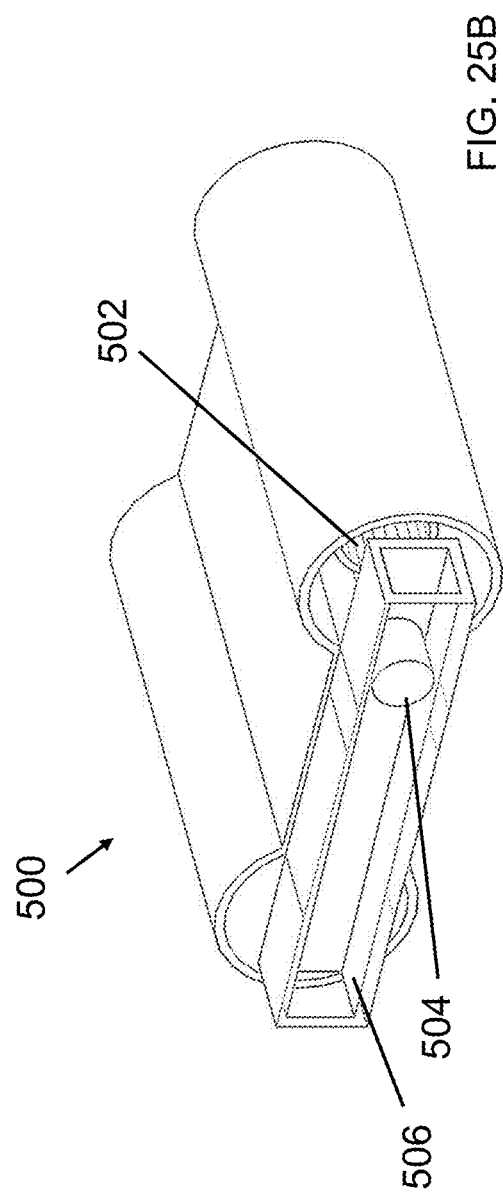
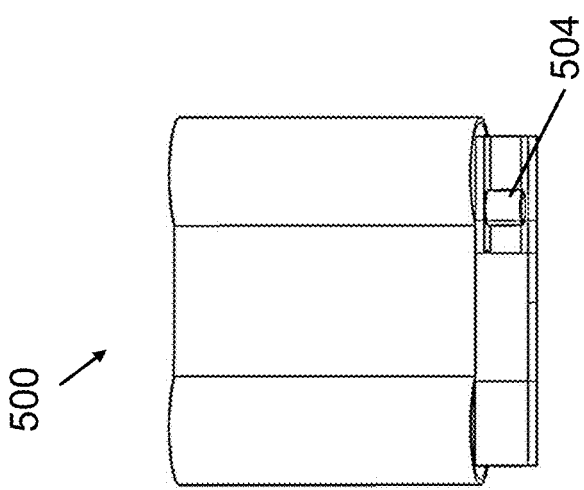

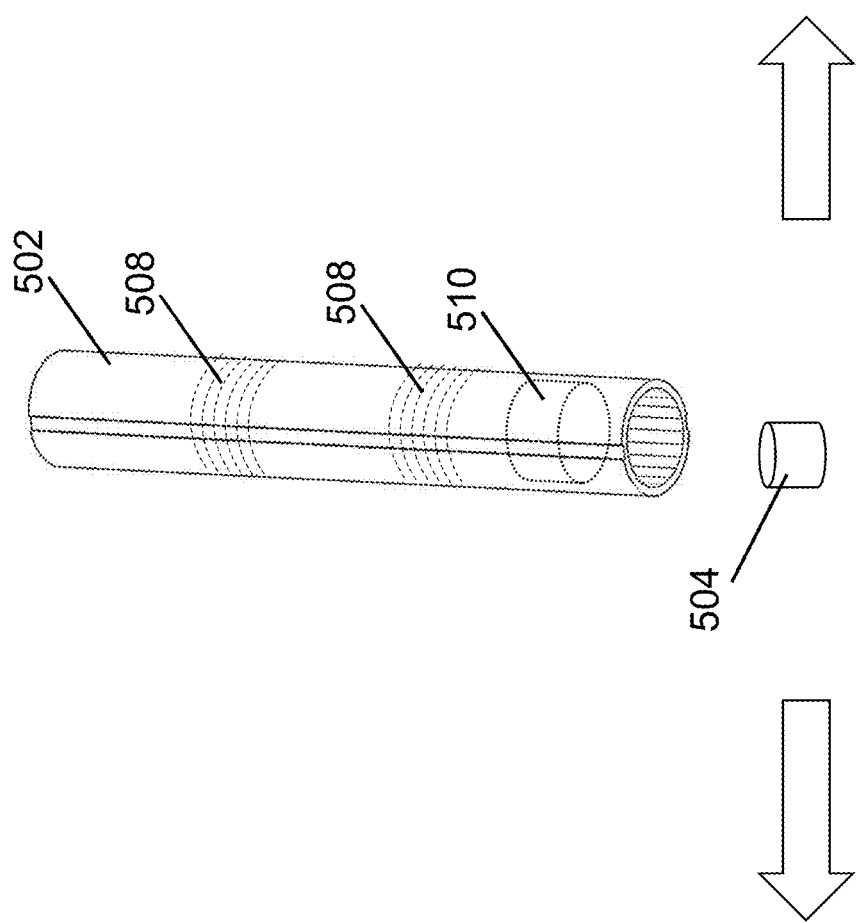

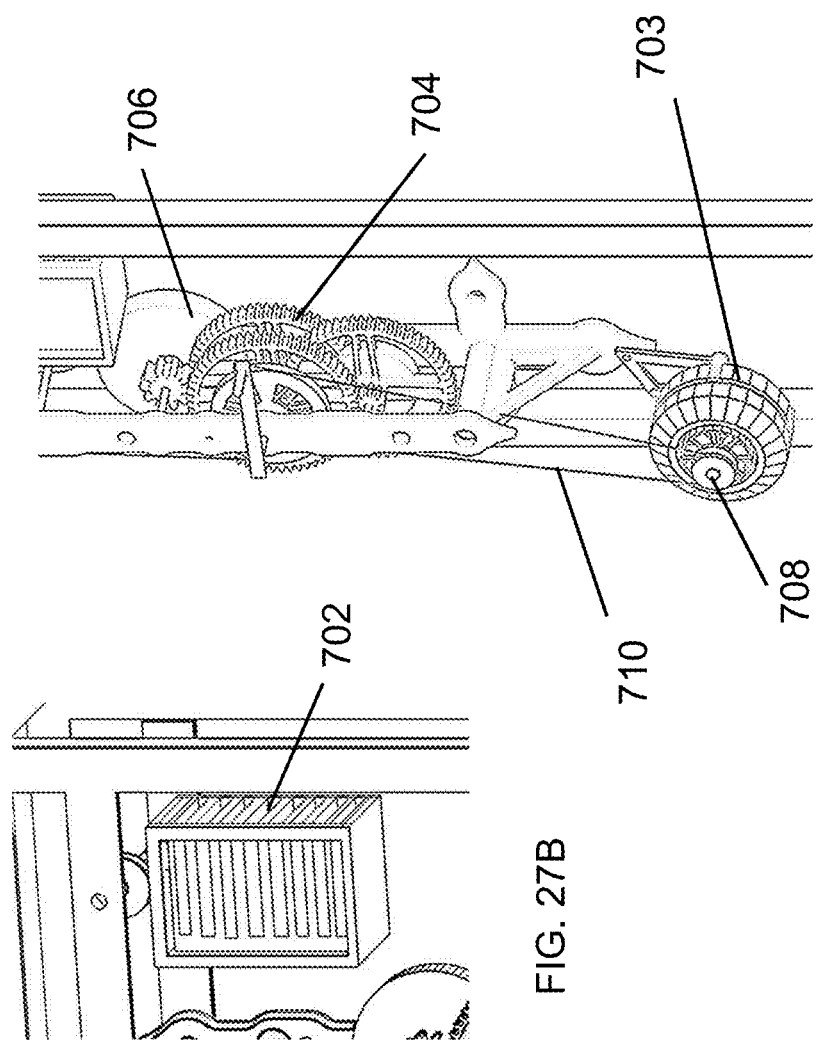
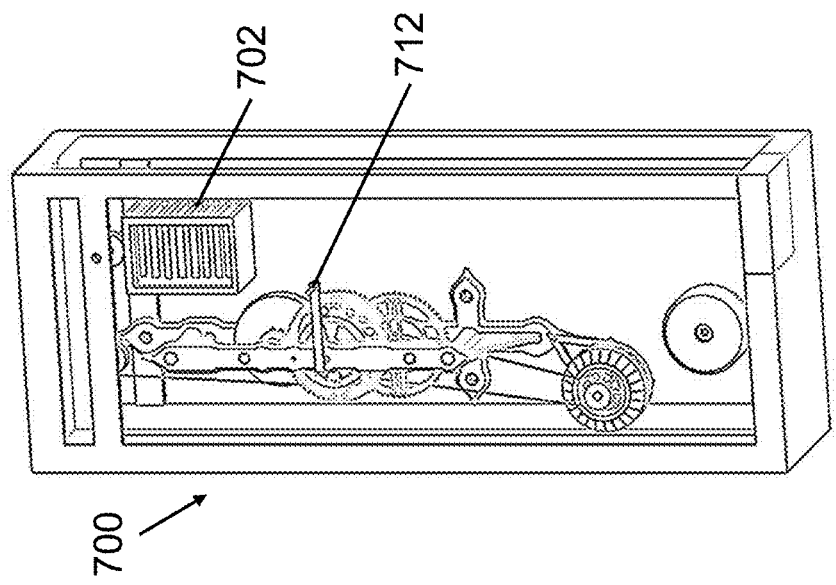
FIG. 27C
FIG. 27B
FIG. 27A

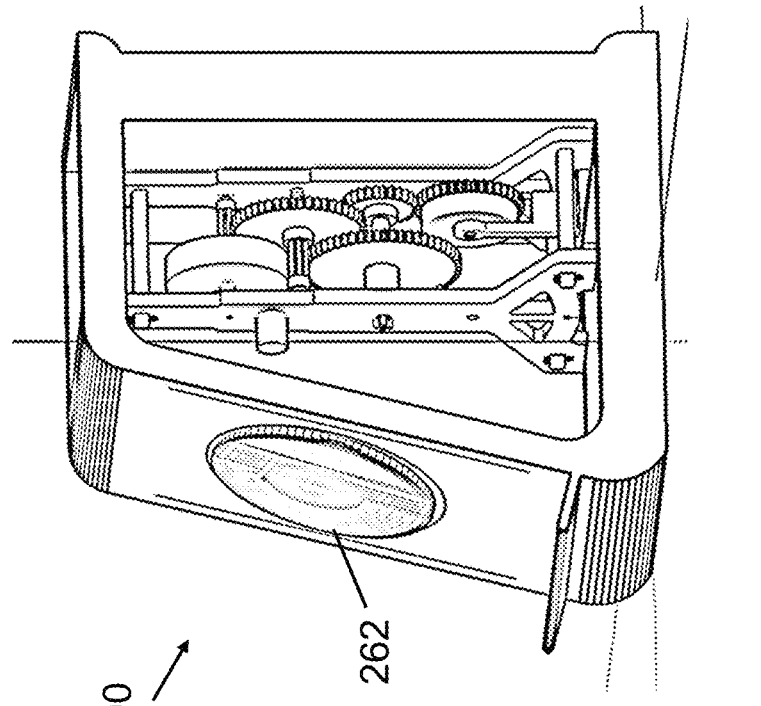
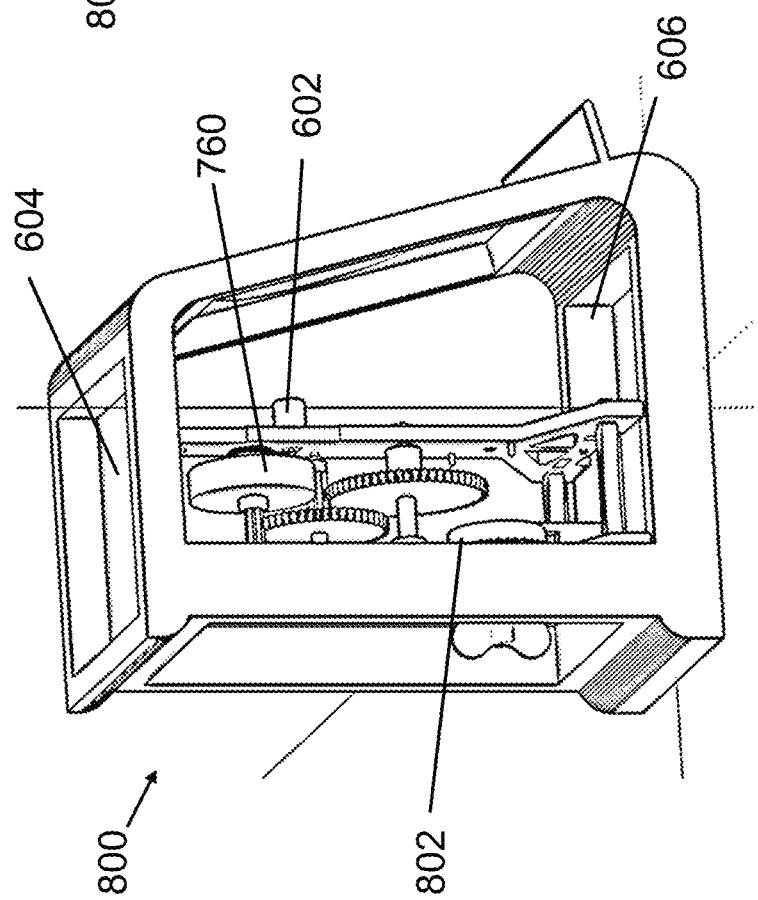
FIG. 28A
FIG. 28B

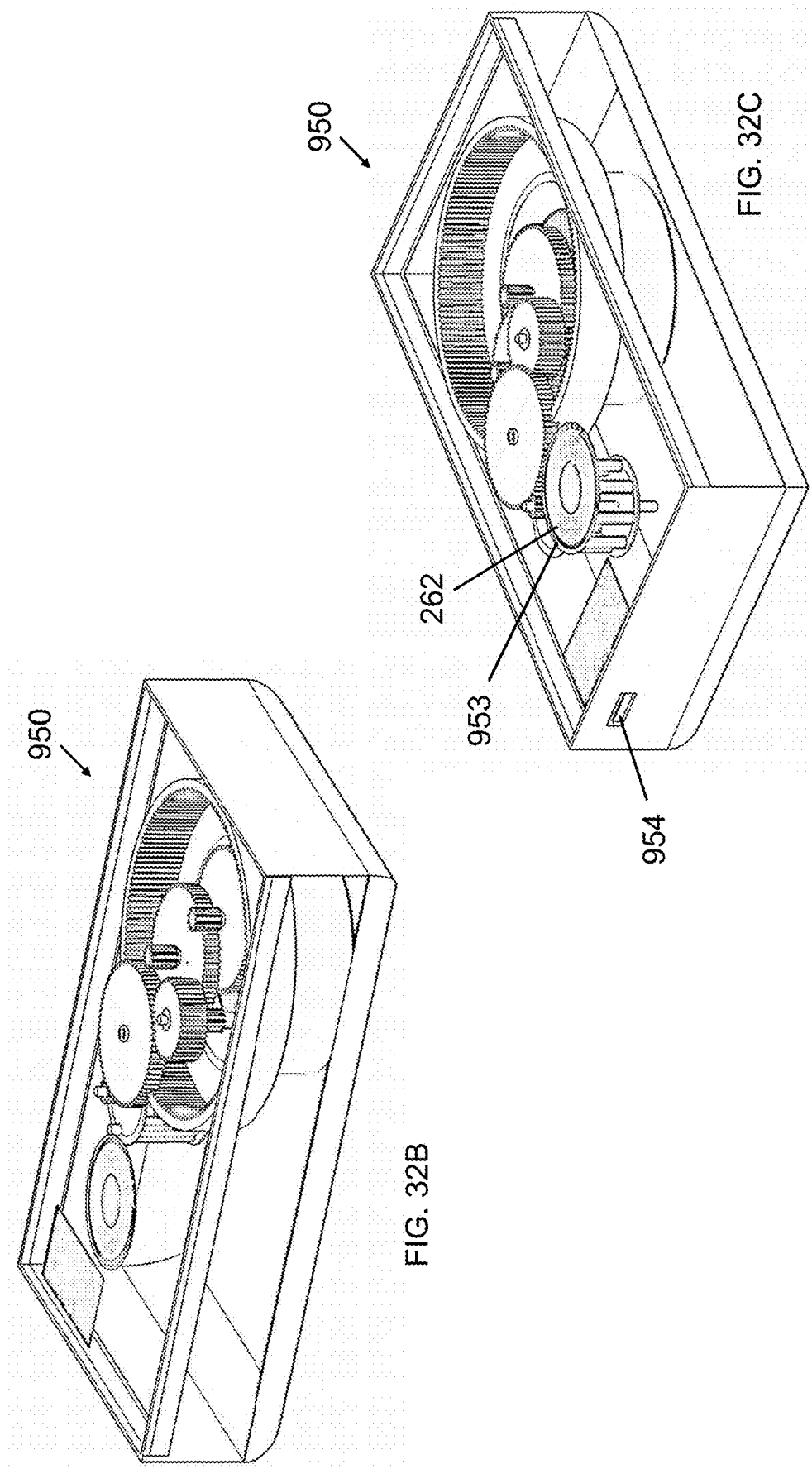

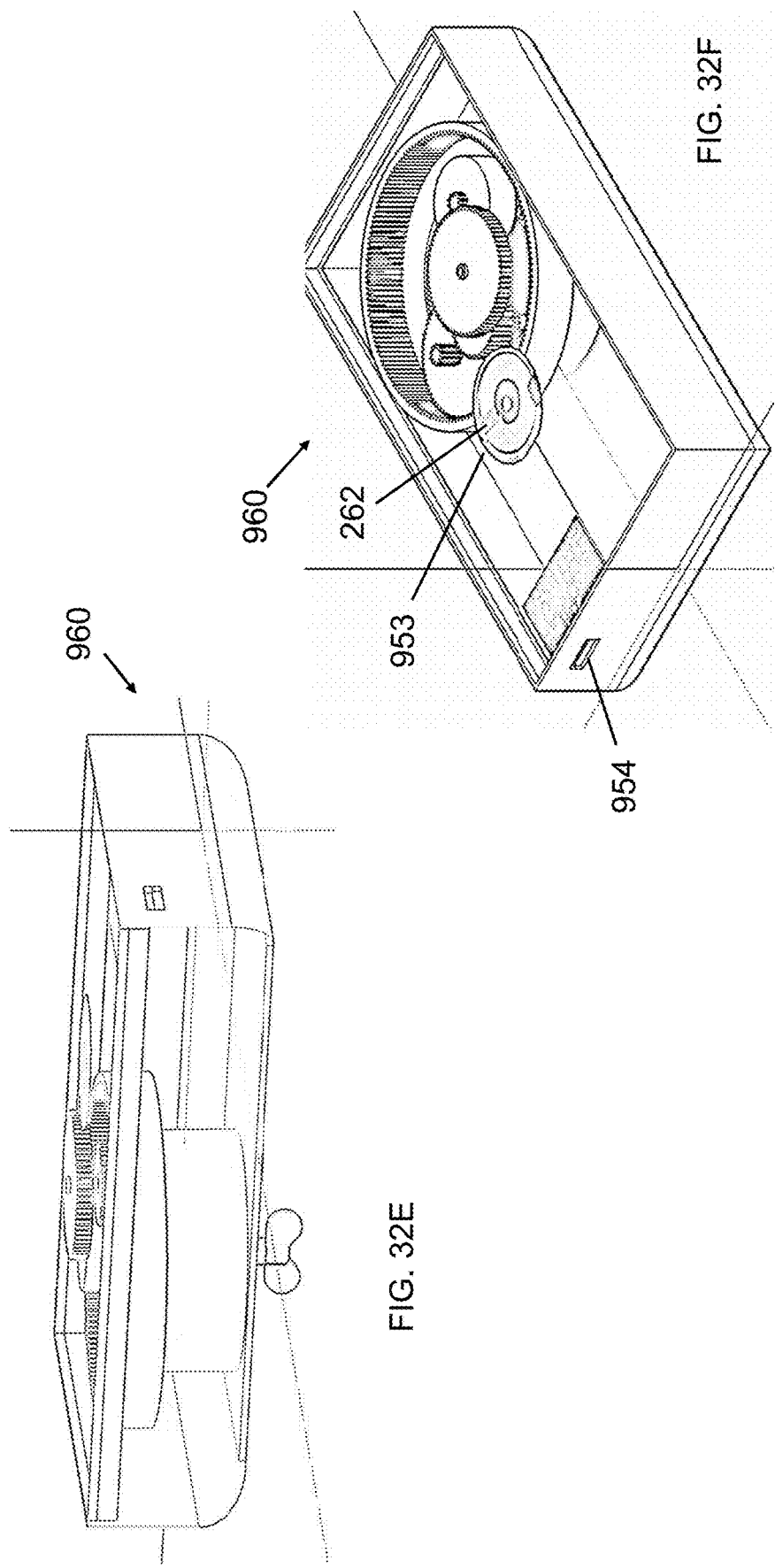

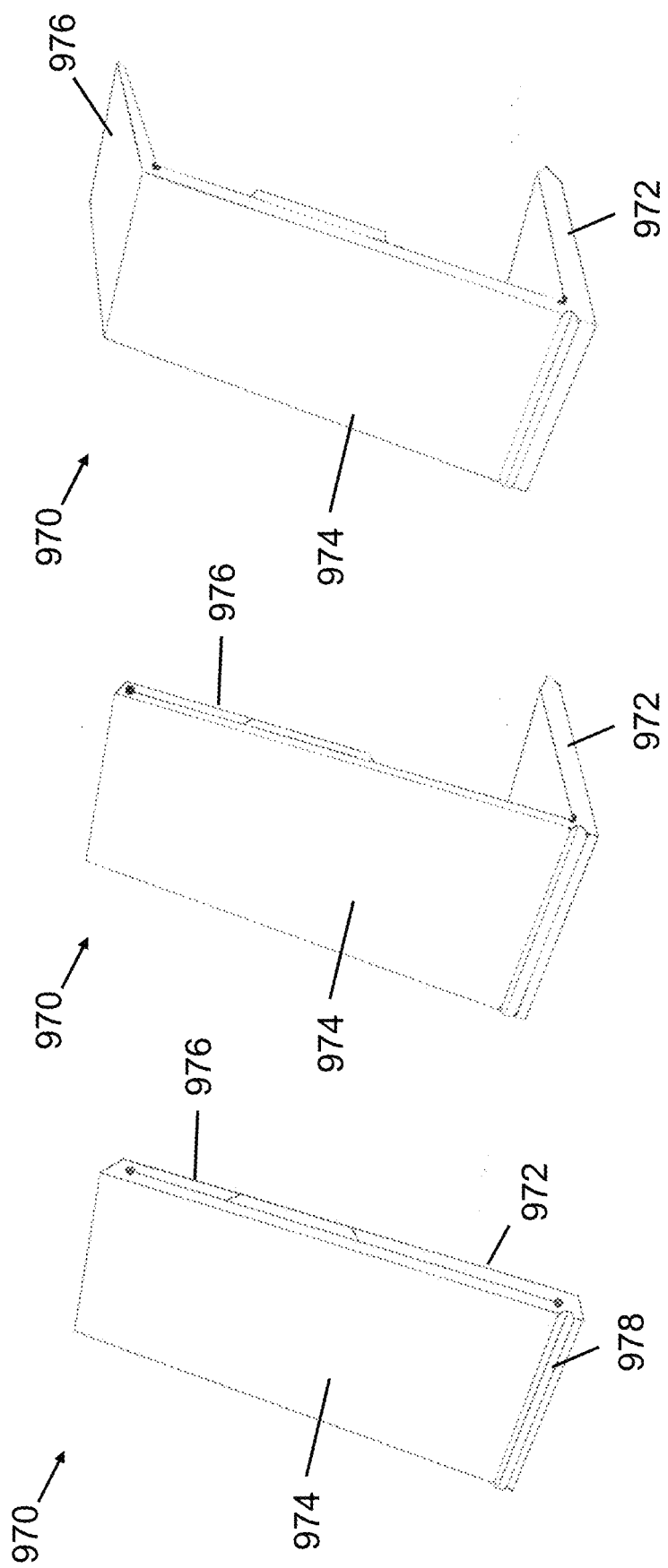

METHODS AND APPARATUS FOR KINETIC ENERGY HARVESTING

CROSS REFERENCE TO RELATED APPLICATIONS

This application is a continuation-in-part of U.S. patent application Ser. No. 17/091,713 filed on Nov. 6, 2020 (to be issued as U.S. Pat. No. 11,043,889) entitled METHODS AND APPARATUS FOR KINETIC ENERGY HARVESTING, which claims priority from U.S. Provisional Patent Application No. 62/931,301 filed on Nov. 6, 2019 entitled METHODS AND APPARATUS FOR KINETIC ENERGY HARVESTING, which are all hereby incorporated by reference.

BACKGROUND

The present application relates generally to kinetic energy harvesting devices including, but not limited to, portable and stationary devices that generate electricity from motion resulting from any type of movement including human movement, movement of traveling vehicles, gravitational movement, and movement resulting from stored spring energy. The kinetic energy harvesting devices can be used for charging batteries and powering devices such as personal electronic devices and electric vehicles.

BRIEF SUMMARY OF THE DISCLOSURE

An apparatus in accordance with one or more embodiments is disclosed for converting kinetic energy to electrical energy. The apparatus includes a housing, a device for converting kinetic energy to electrical energy in the housing, a windup mainspring mechanism in the housing for driving the device for converting kinetic energy to electrical energy to generate an output electric current, and a power management system in the housing receiving the electric current from the device for converting kinetic energy to electrical energy to provide a regulated charge voltage to an external device.

An apparatus in accordance with one or more embodiments for converting kinetic energy to electrical energy includes a housing having a set of rails therein defining a path. The set of rails has electrically conductive surfaces. The apparatus also includes a plurality of magnets fixed at spaced-apart locations in the housing along the path. A wire coil is movably positioned on the set of rails in the housing for back and forth movement along the path such that the movement of the wire coil through magnetic fields of the plurality of magnets generates an alternating current in the wire coil. The ends of the wire coil are electrically connected to the conductive surfaces of the set of rails continuously as the wire coil moves back and forth along the path. A circuit is electrically connected to the wire coil via the conductive surfaces of the set of rails. The circuit includes a rectifier to convert the alternating current generated in the wire coil into direct current.

An apparatus in accordance with one or more embodiments for converting kinetic energy to electrical energy includes a shaft having a plurality of magnets fixed at spaced-apart locations along a length of the shaft. The shaft also includes first and second electrically conductive collectors extending along the length of the shaft. A wire coil element is arranged concentrically around the shaft and configured to travel back and forth from one end of the shaft to an opposite end of the shaft past the plurality of magnets such that the movement of the wire coil through magnetic fields of the plurality of magnets generates an alternating current in the wire coil element. The wire coil element includes a first conductive element connected to one end of a wire coil in the wire coil element and a second conductive element connected to the other end of the wire coil. The first and second conductive elements glide along and maintain electrical contact with the first and second conductive collectors, respectively, as the wire coil element travels back and forth from the one end of the shaft to the opposite end of the shaft. A circuit is electrically connected to the wire coil element via the first and second electrically conductive collectors. The circuit includes a rectifier to convert the alternating current generated in the wire coil element into direct current.

An apparatus in accordance with one or more embodiments for converting kinetic energy to electrical energy includes a housing having a set of rails therein defining a path. A plurality of magnets are fixed at spaced-apart locations in the housing along the path. Electrically conductive surfaces are on opposite sides of the interior of the housing along the path. The apparatus includes a wire coil element comprising a wire coil and two disks on opposite sides of the wire coil. The disks are movably positioned on the set of rails in the housing for back and forth movement along the path such that the movement of the wire coil through magnetic fields of the plurality of magnets generates an alternating current in the wire coil. The wire coil element further comprises conductive elements on the disks electrically connected to opposite ends of the wire coil, wherein the conductive elements are continuously connected electrically to the conductive surfaces in the housing as the wire coil element moves back and forth along the path. A circuit is electrically connected to the wire coil via the conductive surfaces in the housing. The circuit includes a rectifier to convert the alternating current generated in the wire coil into direct current.

An apparatus in accordance with one or more embodiments for converting kinetic energy to electrical energy includes a housing and a plurality of pairs of magnets fixed at spaced-apart locations in the housing defining an arcuate path. The magnets in each pair of magnets have a gap therebetween. A wire coil is movably positioned in the housing for back and forth movement along the path through the gaps between the magnets such that the movement of the wire coil through magnetic fields of the plurality of magnets generates an alternating current in the wire coil. A pendulum mechanism is attached to the wire coil for swinging the wire coil along the path, wherein the pendulum mechanism comprises a shaft having one end pivotally mounted in the housing and an opposite end connected to the wire coil. A circuit is electrically connected to the wire coil, and includes a rectifier to convert the alternating current generated in the wire coil into direct current.

An apparatus in accordance with one or more embodiments for converting kinetic energy to electrical energy includes a plurality of tubes, each having one or more wire coils fixedly positioned therein and a magnet movably positioned inside the tube for back and forth movement from one end of the tube to an opposite end such that the movement of the magnet past each of the one or more wire coils generates an alternating current in the wire coil. The apparatus also includes a structure defining a chamber therein positioned at one of the ends of each of the plurality of tubes, and a levitation magnet movably positioned inside the chamber for movement past the ends of the plurality of tubes. The levitation magnet is oriented in the chamber to repel the magnets in the plurality of tubes to promote movement of the magnets in the tubes. A circuit is electrically connected to the wire coils, the circuit including a rectifier to convert the alternating current generated in the wire coils into direct current.

An apparatus in accordance with one or more embodiments for converting kinetic energy to electrical energy includes a tube assembly comprising a plurality of tubes arranged in a circle. Each tube has one or more wire coils fixedly positioned therein and a magnet movably positioned inside the tube for back and forth movement from one end of the tube to an opposite end such that the movement of the magnet past each of the one or more wire coils generates an alternating current in the wire coil. The apparatus also includes two end plates, each being positioned on an opposite side of the tube assembly such that the tube assembly can rotate relative to the end plates. Each end plate has a levitation magnet fixedly positioned thereon and oriented to repel the magnets in the plurality of tubes to promote movement of the magnets in the tubes as each tube moves past the levitation magnet. A circuit is electrically connected to the wire coils, the circuit including a rectifier to convert the alternating current generated in the wire coils into direct current.

An apparatus in accordance with one or more embodiments for converting kinetic energy to electrical energy a housing with a plurality of magnets fixed at spaced-apart locations in the housing defining a path. The apparatus also includes a pendulum mechanism comprising a pivotally mounted shaft having a first end and a second end. A wire coil is connected to the second end of the shaft such that it is movably positioned in the housing for back and forth swinging movement along the path such that the movement of the wire coil through magnetic fields of the plurality of magnets generates an alternating current in the wire coil. A reverse escapement mechanism is connected to the first end of the shaft for driving the pendulum mechanism. A circuit is electrically connected to the wire coil and includes a rectifier to convert the alternating current generated in the wire coil into direct current.

An apparatus in accordance with one or more embodiments for converting kinetic energy to electrical energy includes a weight, a pulley system supporting the weight, a set of gears connected to the pulley system to convert a descending motion of the weight into a rotational motion, a flywheel connected to the set of gears, and an alternator coupled to the set of gears to generate electrical power from the rotational motion.

An apparatus in accordance with one or more embodiments for converting kinetic energy to electrical energy includes a housing, a direct current generator in the housing, a windup mainspring mechanism in the housing for driving the direct current generator to generate an output electric current, and a power management system in the housing receiving the electric current from the windup mainspring mechanism to provide a regulated charge voltage to an external device.

An apparatus for converting kinetic energy to electrical energy is disclosed in accordance with one or more embodiments. The apparatus includes a housing. A plurality of magnets are fixed at spaced-apart locations in the housing defining a path. A wire coil is movably positioned in the housing for back and forth movement along the path such that the movement of the wire coil through magnetic fields of the plurality of magnets generates an alternating current in the wire coil. A circuit is electrically connected to the wire coil. The circuit includes a rectifier to convert the alternating current generated in the wire coil into direct current.

A method for converting kinetic energy to electrical energy in accordance with one or more embodiments comprises the steps of: moving a wire coil back and forth along a path defined by a plurality of magnets fixed at spaced-apart locations in a housing such that the movement of the wire coil through magnetic fields of the plurality of magnets generates an alternating current in the wire coil; and converting the alternating current generated in the wire coil into direct current.

BRIEF DESCRIPTION OF THE DRAWINGS

FIGS. 1A and 1B illustrate an exemplary kinetic energy harvesting device with a moving cylindrical coil mounted on a cylindrical magnet array in accordance with one or more embodiments.

FIG. 22 illustrates an exemplary kinetic energy harvesting device having a pendulum mechanism in accordance with one or more embodiments.

FIG. 23 illustrates a vehicle showing exemplary locations in which kinetic energy harvesting devices in accordance with one or more embodiments can be positioned.

FIGS. 24A and 24B illustrate an exemplary kinetic energy harvesting device having a reverse escapement mechanism in accordance with one or more embodiments.

FIGS. 25A-25D illustrate an exemplary kinetic energy harvesting device having a tube structure with fixed coils and moving magnets in accordance with one or more embodiments.

FIGS. 27A-27C illustrate an exemplary alternate stationary device for kinetic energy harvesting having a gravity-powered alternator in accordance with one or more embodiments.

FIGS. 28A and 28B illustrate an exemplary alternate stationary device having a windup mainspring mechanism for kinetic energy harvesting in accordance with one or more embodiments.

FIGS. 32A-32C illustrate an exemplary kinetic energy harvesting device with a shaft drum assembly in accordance with one or more further embodiments.

FIGS. 32D-32F illustrate an exemplary kinetic energy harvesting device with a DC generator in accordance with one or more further embodiments.

FIGS. 33A-33C illustrate an exemplary stationary kinetic energy harvesting device in accordance with one or more embodiments.

DETAILED DESCRIPTION

Various embodiments disclosed herein relate to kinetic energy harvesting devices including, but not limited to, portable and stationary devices that generate electricity from human movement, as well as from gravitational movement, and movement resulting from stored spring energy for use in charging batteries and powering devices such as personal electronic devices and electric vehicles.

By way of example, a kinetic energy harvesting device in accordance with one or more embodiments includes a housing with a plurality of magnets fixed at spaced-apart locations in the housing. A wire coil is movably positioned in the housing for reciprocating (i.e., back and forth) movement past the magnets. The reciprocating movement of the wire coil through magnetic fields of the magnets generates an alternating current in the wire coil. A circuit electrically connected to the wire coil includes a rectifier to convert the alternating current generated by the wire coil into direct current. The device can be used for various purposes, including charging a battery for powering various devices including a portable electronic device like Android and iPhones smartphones, and electric vehicles such as automobiles and airplanes.

The following are non-limiting examples of kinetic energy harvesting devices in accordance with various embodiments.

Moving Cylindrical Coil on a Cylindrical Magnet Array

Figure 1B:
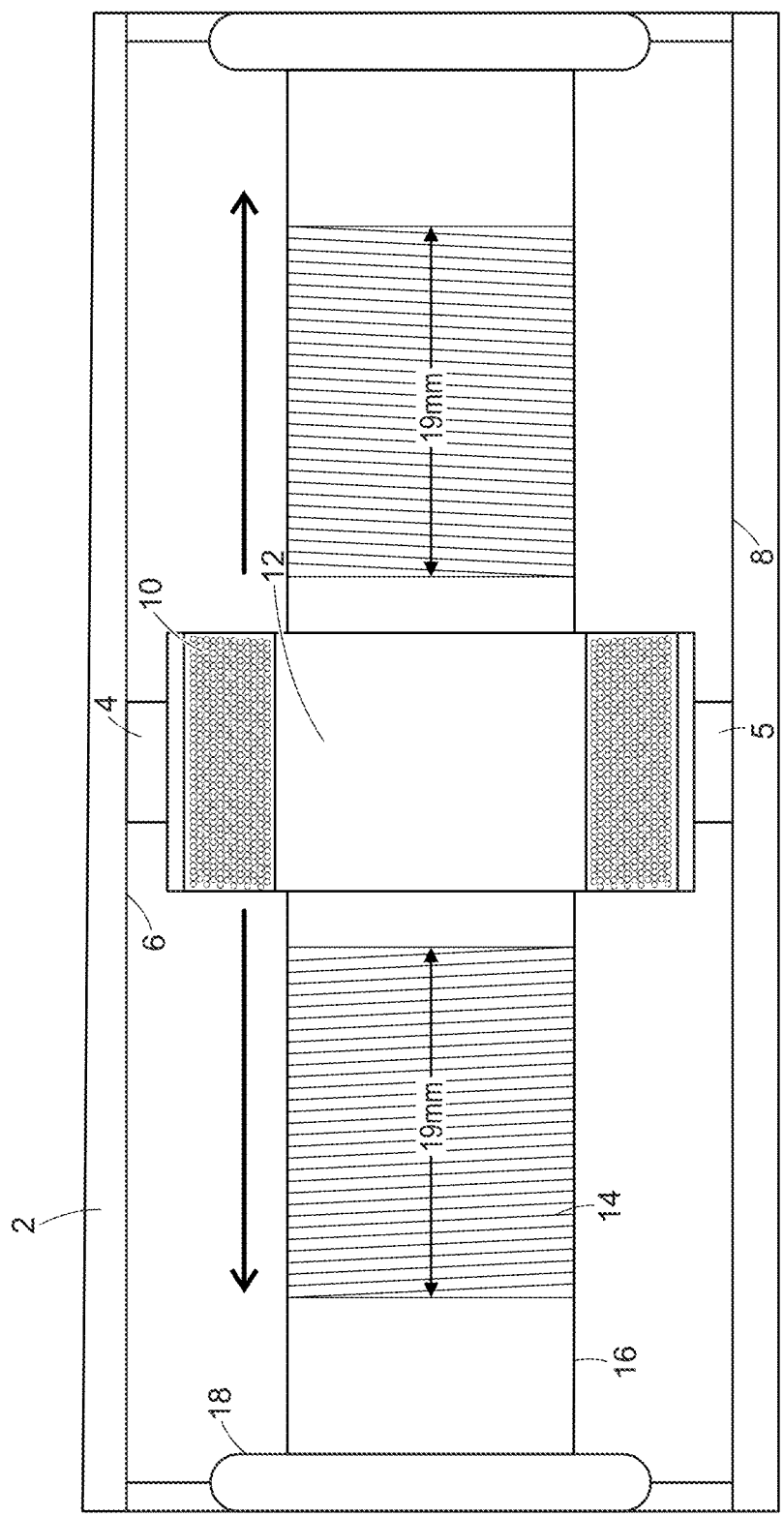

FIGS. 1A and 1B illustrate an exemplary kinetic energy harvesting device with a moving cylindrical coil on a cylindrical magnet array in accordance with one or more embodiments. FIGS. 1A and 1B show the device without and with the outer housing, respectively.

In this embodiment, a wire coil 10 is wound around a tubular element 12 that is arranged concentrically around a cylindrical shaft 16. The figures show a partial cross-section view of the wire coil 10 around the tubular element 12 for purposes of illustration.

One or more cylindrical magnets 14 are spaced-apart over the length of the shaft 16.

The wire coil 10 harvests electric energy from kinetic energy as it moves along the shaft 16 across the cylindrical magnets 14. A burst of electric current is generated as the coil 10 moves across each magnet 14. The motion of the coil 10 induces negative and positive pulses into the coil. The coil 10 is electrically connected to one or more circuits (discussed in further detail below) that regulate, rectify, and provide the balanced voltage feed to charge uninterrupted battery backup and or a charging port such as a USB charging port, as will be discussed below.

As shown in FIG. 1B, an outer housing 2 contains the energy harvesting device. The inner wall of the housing 2 is lined with separate conductive surfaces at opposite sides 6 and 8. One end of the wire coil 10 is electrically connected by conductive element 4 to the conductive surface 6. The other end of the wire coil 10 is electrically connected by conductive element 5 to the conductive surface 8. The conductive surfaces 6, 8 are electrically connected to the one or more circuits mentioned above. The conductive elements 4, 5 glide along the conductive surfaces 6, 8, respectively. The conductive surfaces 6, 8 can comprise, e.g., a layer of copper or brass (e.g., 0.4 mm thick) that is polished to reduce friction losses as the coil moves back and forth in the housing.

Although two magnets 14 are shown in the figure, generally any number can be used.

Two spring elements 18 that can be impacted by the wire coil 10 are provided at opposite ends of the shaft 16. The spring elements 18 provide a spring-like repelling effect on the wire coil 10 as it reaches each end of the shaft 16. This mitigates inertia losses as the wire coil changes its direction of travel on the shaft. In one example, the spring elements increase the energy available for harvest by a factor of 0.02 N.

In this example, the spring elements comprise O-Rings. Other types of spring elements are also possible, including various type of flat and coiled springs, membranes etc.

The spring elements can be incorporated in any of the embodiments disclosed herein for mitigating inertia losses.

Figure 2:
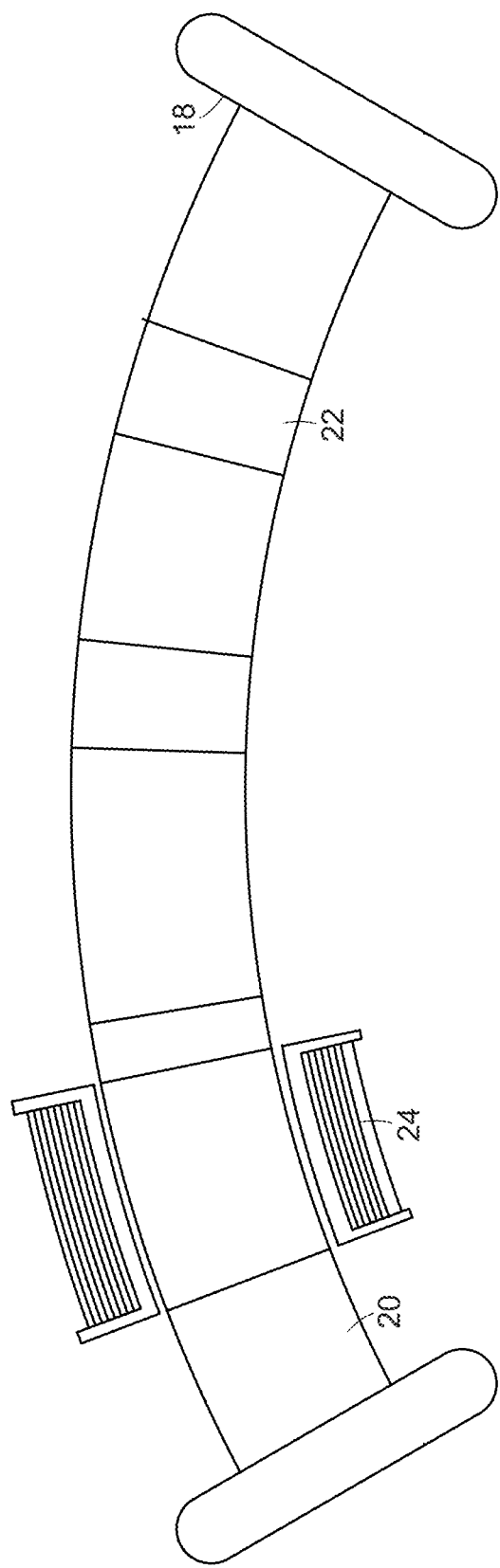
FIG. 2 illustrates another exemplary kinetic energy harvesting device with a moving cylindrical coil on a curvilinear cylindrical magnet array in accordance with one or more further embodiments.

FIG. 2 illustrates an alternative embodiment similar to the FIGS. 1A and 1B embodiment. This embodiment includes a shaft 20 having magnets 22 that has a curvilinear shape or gentle U-shape instead of the straight shape depicted in FIGS. 1A and 1B. The wire coil 24 also has a curvilinear shape matching the radius and bend of the shaft 20. This design enhances the sensitivity of the moving coil to motion of the device.

In one example, the wire coil 24 comprises a cylindrical coil 16 mm in diameter and 25 mm long. In one example, the magnets are natural earth magnets having 3000 mGauss or better field-strength. In one example, the shaft on which the magnets are mounted is an acrylic shaft.

Figure 3:
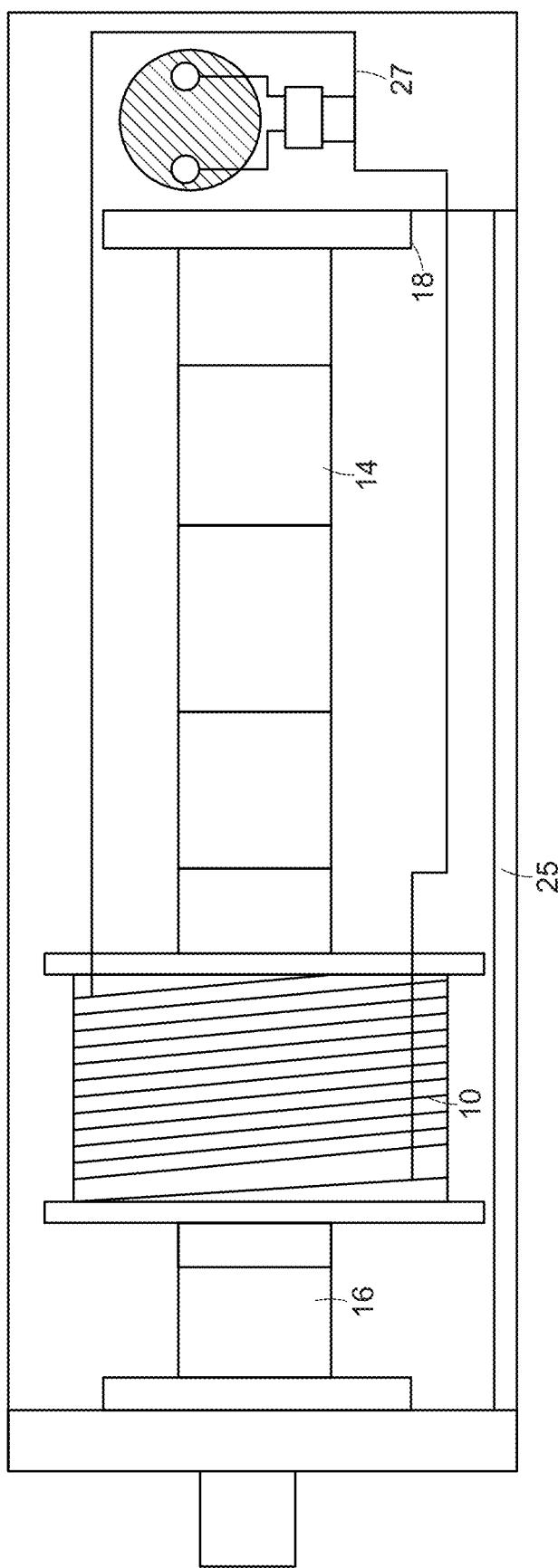
FIG. 3 illustrates an exemplary kinetic energy harvesting device in an enclosure sized and shaped like a battery in accordance with one or more further embodiments.

FIG. 3 illustrates one example of a type of housing 25 for a device with a moving cylindrical coil 10 on a cylindrical magnet array in accordance with one or more further embodiments. The housing 25 is sized and shaped like a battery. The housing 25 includes a circuit 27 (similar to circuits discussed below) electrically connected to the wire coil 10, which includes a rectifier to convert the alternating current generated by the wire coil into direct current and an internal battery to store electrical energy generated by the device.

Various battery sizes can be used including, but not limited to, a D-size battery or a B-size battery. In one exemplary application, the energy-harvesting device can be installed in a standard flashlight using batteries. The device stores kinetic energy to power an LED in the flashlight. It is estimated that 1 minute of kinetic motion can provide 10 minutes to an hour of light output depending on LED brightness.

Flat-Magnet-Pair Rotary Motion Generator

Figure 4A:
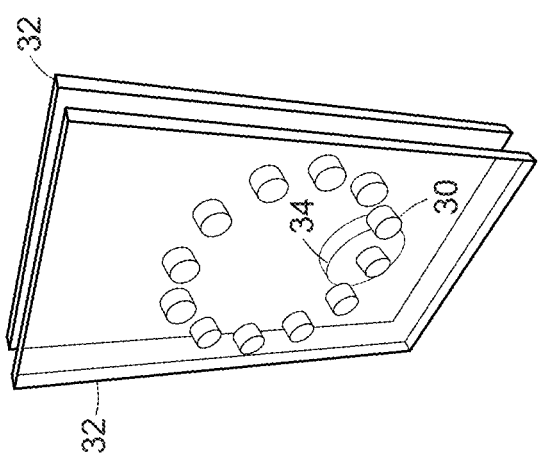
FIGS. 4A and 4B illustrate an exemplary rotary motion energy harvesting device in accordance with one or more further embodiments.
Figure 4B:
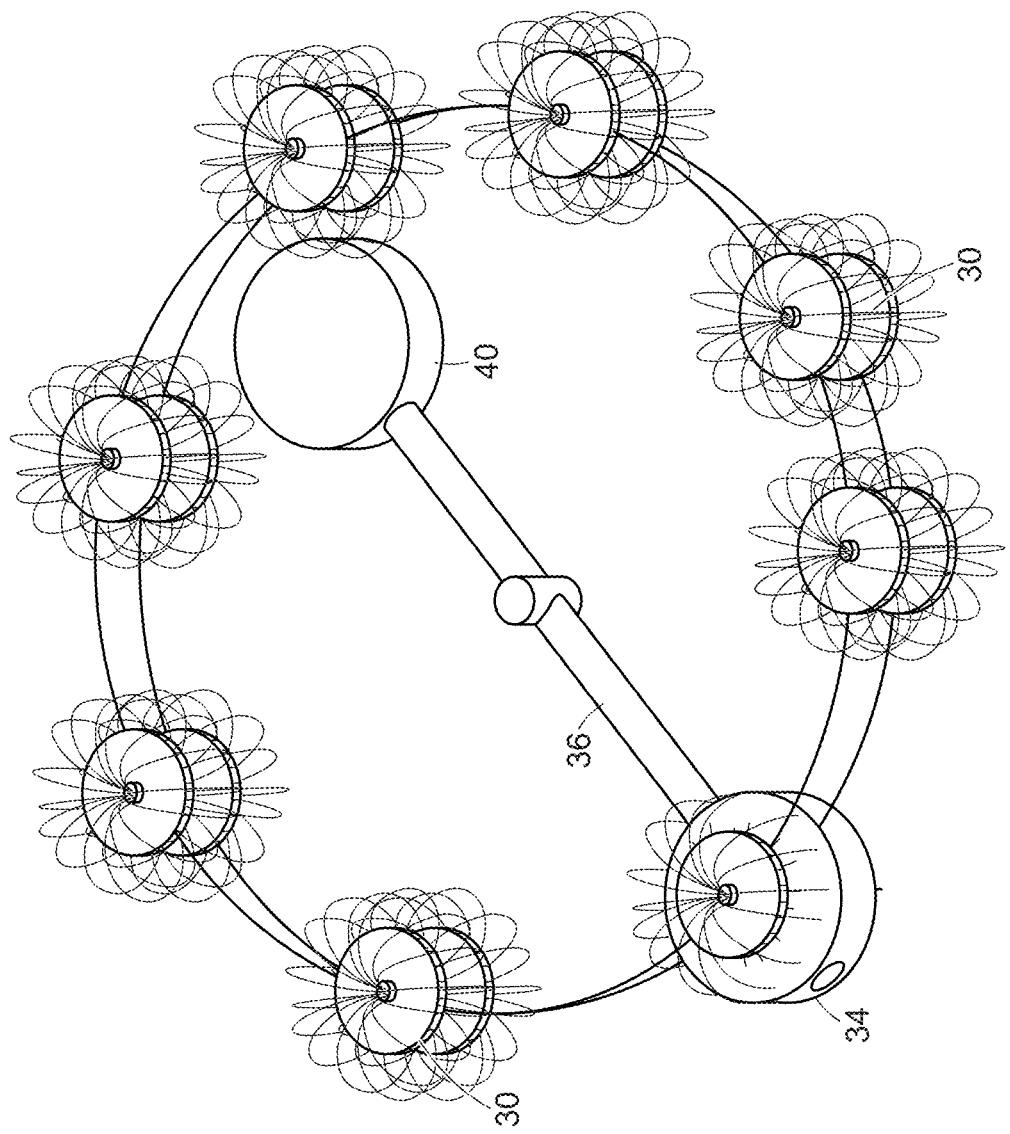

FIGS. 4A and 4B illustrate an exemplary flat-magnet-pair rotary motion generator energy-harvesting device in accordance with one or more further embodiments. FIG. 4A illustrates the arrangement of magnets 30 on the panels 32 of a housing. The shaft and anchor mechanism is not shown in this figure for ease of illustration, but is depicted in FIG. 4B.

In this embodiment, flat magnets 30 are arranged in North-South pairs in a circular array. The magnets 30 are on two adjacent panels 32 (shown in FIG. 4A). An open gap between the two panels 32 provides space for a movable flat coil element 34 to move freely in the gap through the magnetic fields formed between the magnet pairs 32. As shown in FIG. 4B, the coil element 34 is attached to one end of a shaft 36. The shaft 36 is anchored in the center of the circular array of magnets. The moving coil element 34 at the end of the shaft 36 moves freely like the pendulum of a clock. The weight of the coil element 34 at one end of the shaft 36 is counterweighted at 40 at the opposite end of the shaft by element 36. This configuration features scalability. The magnet pairs 30 and flat coil 34 allow scaling overall thickness of this motion generator. The coil is flat, and to increase conductivity, its diameter can be increased. In addition, the field strength of the flat magnets 30 can be increased by choosing larger diameter magnets. The flat area of the motion generator increases for greater harvesting efficiency, but the overall thickness can be unchanged. This configuration provides improved sensitivity to motion.

This pendulum-like arrangement is very sensitive to the earth's center of gravity as the coil swings passing though the gaps between the magnet pairs 30. The inductance of the coil 34 and the field strength of the magnets 30 is constant. The harvested current burst energy is proportional to coil inductance, magnetic field strength, the velocity of the coil swings, and the number of magnet pairs the coil swing will pass on a swing.

As with other embodiments, the coil 34 is electrically connected to one or more circuits (described below) that regulate, rectify, and provide the balanced voltage feed to charge uninterrupted battery backup and or a charging port such as a USB charging port, as will be discussed below. The coil can be connected to the circuits through electrical wiring extending through the shaft 36.

Pocket Version Motion Generator Embodiment

Figure 5:
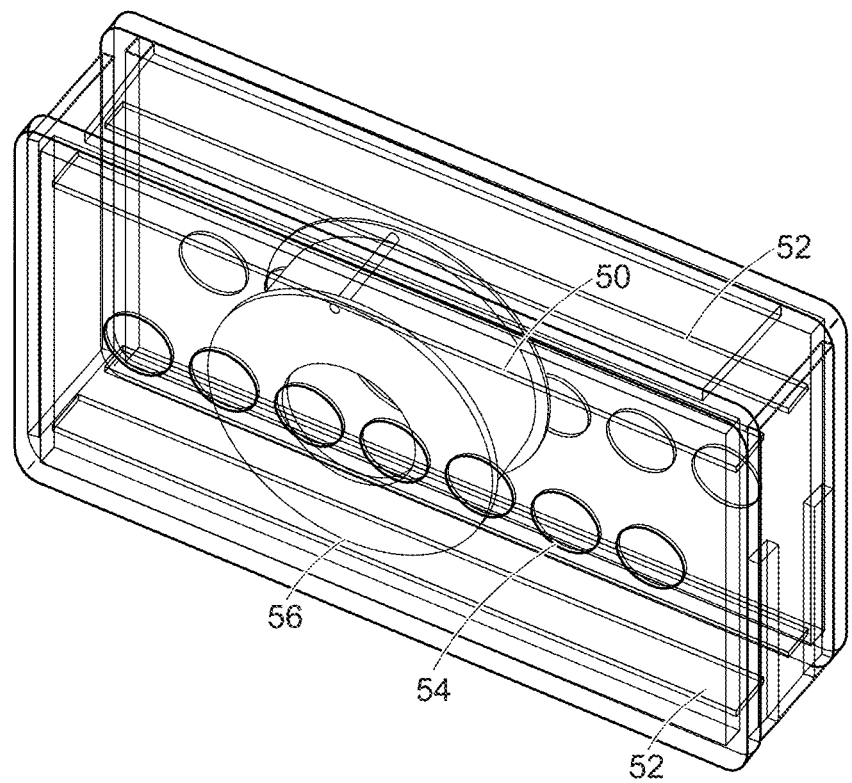
FIGS. 5 and 6 illustrate additional exemplary kinetic energy harvesting devices in accordance with one or more embodiments.
Figure 6:
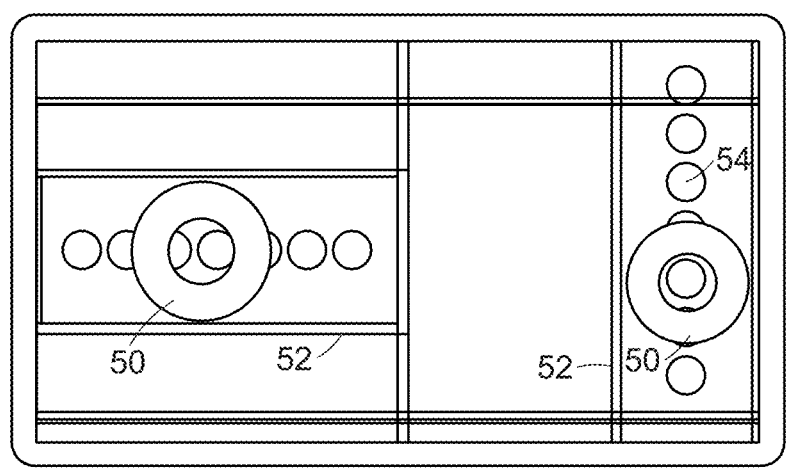

FIGS. 5 and 6 illustrate additional exemplary kinetic energy harvesting devices in accordance with one or more embodiments. These devices comprise a small (e.g., pocket-sized) motion generator mechanism. In the devices, forces are captured due to linear motion of one or more free moving coils 50.

The FIGS. 5 and 6 devices each include a flat box shaped enclosure having a set of guide rails 52. Each coil 50 moves in the enclosure guided by the guide rails 52 past a row of magnets 54. The coil 50 in the FIG. 5 enclosure can only move right or left. The FIG. 6 embodiment has two coils 50: one coil 50 moves left or right, while the other coil 50 moves transversely up or down.

The guide rails 52 and coil slider bracket 56 (on which the coil 50 is wound) have a loose fit arrangement between the touching surfaces. The coil 50 will react to an imbalance of the enclosure horizontal relative to the gravitational force. The coil 50 will gravitate to one direction depending on the tilt or the resulting incline of the guardrails 52 and slide freely in either direction.

The four-point fixation of the coil slider bracket 56 within the four guiding rails 52 in addition allows for free sliding in any tilting (forward or backward) of the enclosure's horizontal orientation.

Conductive collectors are arranged on both side disks of the bracket 56 connected to the coil ends. These are electrically connected to conductive flat surfaces on the edge of all four guide rails 52. This provides a continuous electrical connection of the electromagnetic generated power source to connected circuits. The circuits regulate, rectify, and provide the balanced voltage feed to charge uninterrupted battery backup and or a charging port such as a USB charging port, as will be discussed below.

The magnets 54 in this and other embodiments can comprise a set of small flat rare-earth magnets are embedded in the enclosure walls. A gravitational imbalance of the enclosure will cause linear movement of the coil 50, which will break the magnetic field. The coil 50 and the magnets 54 do not touch, but are positioned closely to reduce air losses by making air gaps as small as possible.

Figure 7:
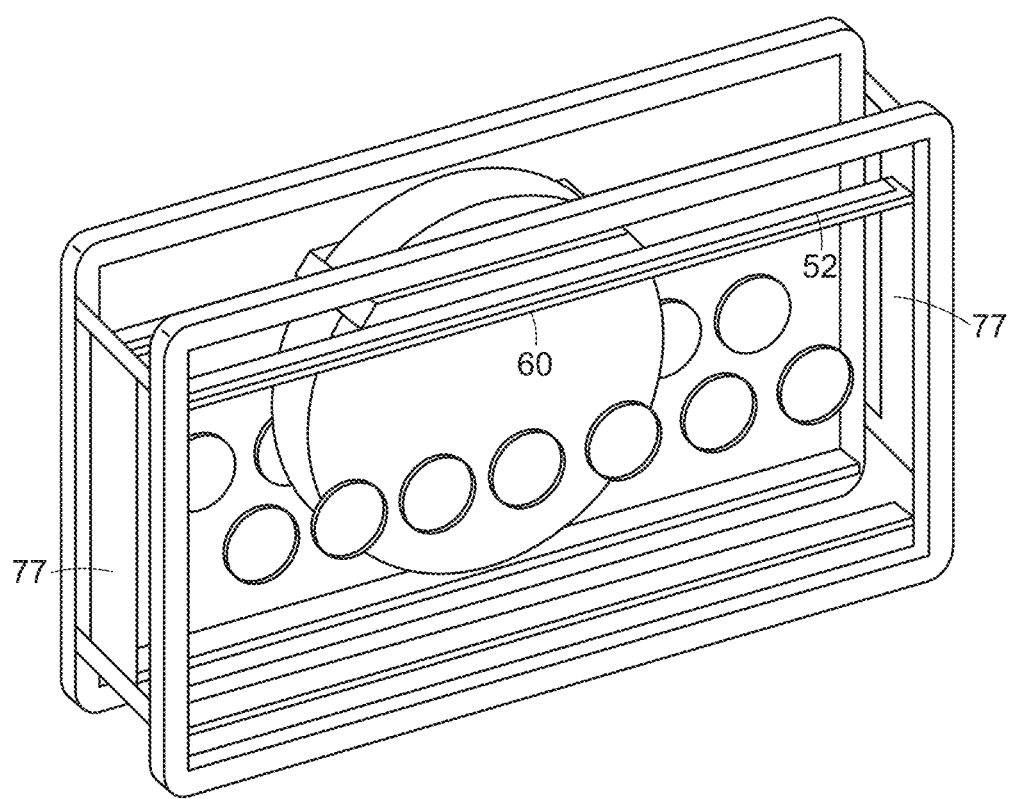
FIG. 7 illustrates an exemplary guardrail of a kinetic energy harvesting device with a groove holding ball bearings to reduce friction in accordance with one or more embodiments.

In one or more embodiments, small diamagnetic ball bearings 60 (as shown in FIG. 7) are installed on guide rails 52 to reduce friction as the coil bracket 56 glides on the rails 52. The guardrails 52 can have small grooves to hold a number of diamagnetic spheres 60 fitted in sufficient numbers to provide optimized friction free sliding off the coil assembly 56. It is desired to capture as much imbalanced gravity movement as possible to convert it into magnetic induced power in the coil. Mechanical friction losses are thereby preferably minimized. Such guide rails with ball bearings can be implemented in any of the embodiments disclosed herein. In one or more embodiments, the housing is equipped with membranes 77 at opposite ends of the rails 52. The membranes function as spring elements to reduce inertial losses as the coil reaches the end of the housing and changes direction. In one exemplary embodiment, the membranes 77 can comprise brass foils having a 0.35 mm thickness.

In operation, any imbalance of the devices will cause the coil 50 to move inside its chamber. As the coil 50 moves through the magnetic fields of the magnets 54, an alternating electric current is generated in the coil 50. As with other embodiments, a circuit is connected to the coil 50. The current generated in the coil 50 is converted by a bridge in the circuit to direct current, and processed as will be discussed below.

Figure 8:
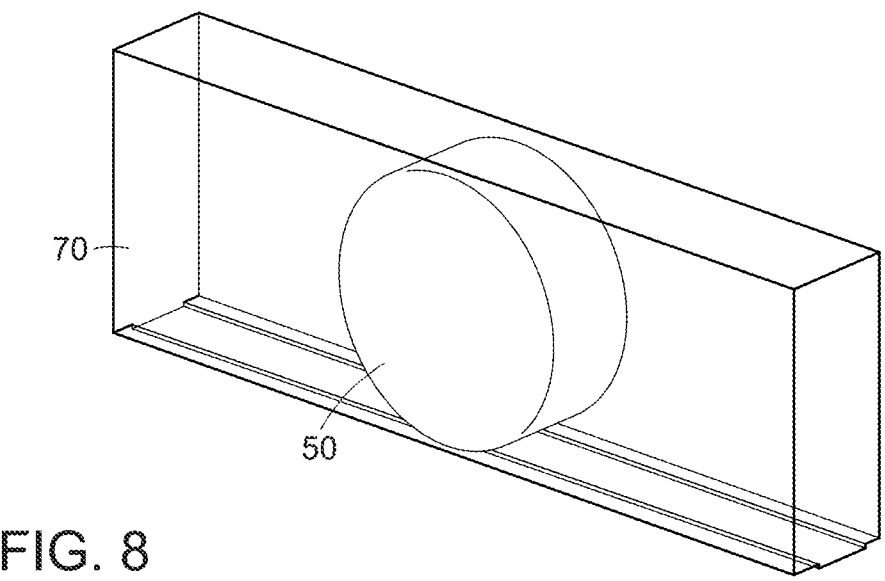
FIG. 8 illustrates an exemplary kinetic energy harvesting device in which the coil is mounted in an airtight and vacuum chamber in accordance with one or more embodiments.

FIG. 8 illustrates an exemplary energy-harvesting device in which friction is reduced by containing the coil 50 in an airtight and vacuum chamber 70. The coil 50 will move in a vacuum to avoid any air friction or air pockets at either end of the chamber. This additional optimization could optionally also feature the friction reducing guide rails (with or without ball bearings) as described above. The objective of a vacuum chamber 70 is to avoid air pockets, which reduce the velocity of the coil and as the result reduce the efficiency of flux. The velocity of the coil movement is directly proportional to the function between magnetic arrays and amount of electrical field flux. Adding the ball bearing guide rails further reduces mechanical friction. Use of such an airtight vacuum chamber can be implemented in any of the embodiments disclosed herein.

The energy harvesting devices can be implemented in various types of additional enclosures, e.g., an enclosure sized and shaped like a battery as previously discussed.

Scalable Implementation of Multi-Dimensional Vacuum Coil Chamber

Figure 9:
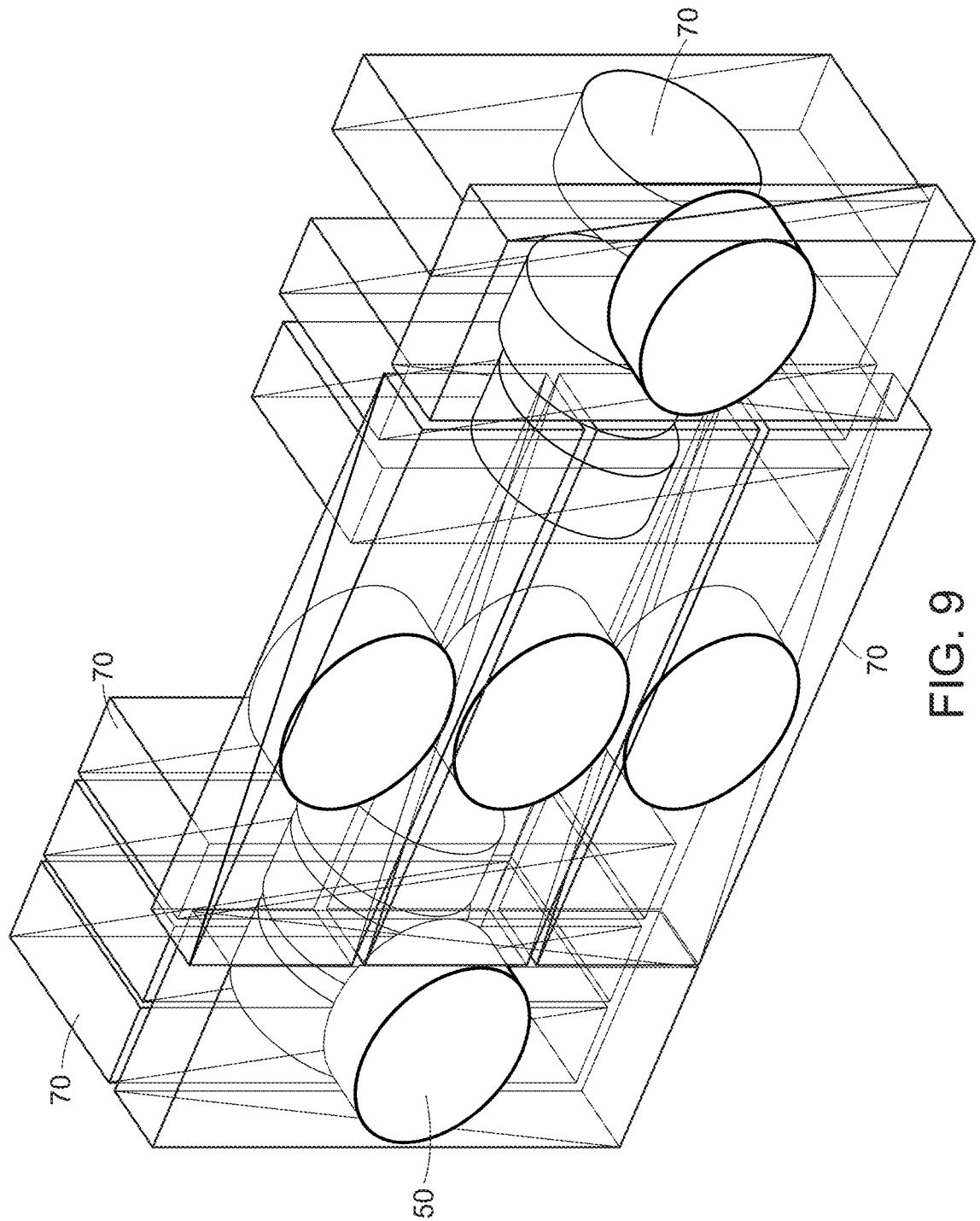
FIG. 9 illustrates an exemplary kinetic energy harvesting device having multiple chambers each with one moving coil.

FIG. 9 illustrates an exemplary kinetic energy harvesting device in accordance with one or more embodiments having multiple kinetic energy harvesting chambers 70, each with one moving coil 50 therein. The chambers 70 are arranged in transverse directions to enhance capturing kinetic movement in any direction. The chambers 70 can each comprise a vacuum chamber, as discussed above.

Gravity Pendulum Motion Generator Embodiment

Figure 10B:
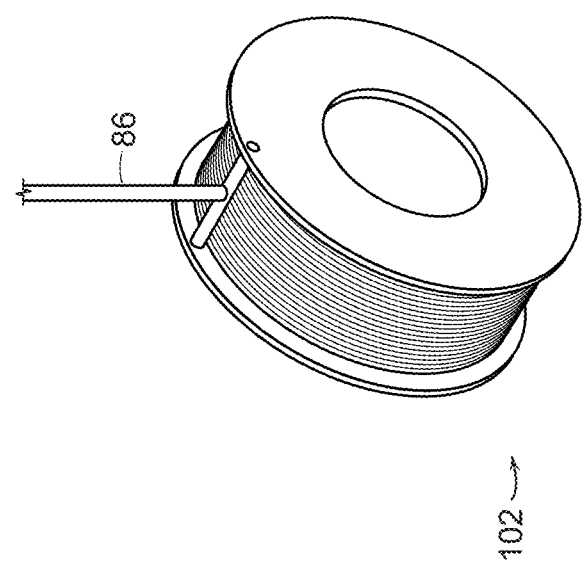
FIG. 10B is an enlarged view of the inductive air coil of the pendulum kinetic energy harvesting device of FIG. 10A.
Figure 10A:
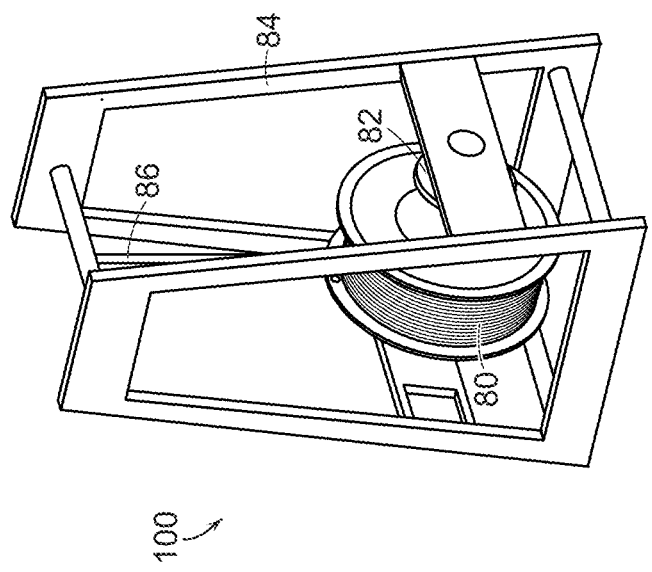
FIG. 10A illustrates an exemplary pendulum kinetic energy harvesting device in accordance with one or more embodiments.

FIGS. 10A and 10B depict an exemplary gravity pendulum kinetic energy harvesting device in accordance with one or more embodiments. The device converts the swing motion of the pendulum kinetic energy into electrical energy. The device uses the inductive properties of an inductive air coil 80, which can be measured, e.g., in millihenry, to generate electric periodical pulses. The electrical pulses are inducted by the coil's periodic movements through a static magnetic field. The source of the static magnetic field is a set of rare magnetic disks 82 arranged at the opposite ends of the swing pass of the inductive coil 80.

The device uses gravitational forces and swing motion to generate electricity from the motion of the inductive coil 80 in a magnetic field. The device combines well-known physical properties of electromagnetism and mechanical properties of a gravity pendulum. Integrating the physical properties of these basic and fundamentally known technical principles in this way provides a unique apparatus to generate renewable electrical energy.

The coil 80 releases periodic electrical pulses at the frequency of the periodic swings of the pendulum moving the coil 80 between the permanent magnets 82. The captured electrical energy is proportional to the frequency of the pendulum swings and the electromagnetic induction captured by the coil's inductive properties. In some particular examples, the device generates approximately one to two watts of power.

By way of example, the magnets 82 in this and other embodiments disclosed herein can be natural earth magnets having 3000 mGauss or better field-strength.

The positive and negative pulse trains produce an alternating current that is fed to a connected solid-state rectifier electric circuit discussed below. The electrical circuit filters and converts the alternating current pulses into direct current, in some exemplary applications at a voltage of more than 10 to 12 volts.

The electromagnetic coil 80 is suspended in a frame structure 84. In one example, the coil 80 has a diameter of about 25.4 mm and a depth of about 21 mm. The coil wire has a thickness of about 0.45 mm. The coil 80 is mounted at the end of a pendulum arm 86, which has a length of about 60 mm.

The coil 80 is mounted at the low gravity point of a pendulum. The coil swing movements are limited by the magnet mounts located spaced by 8 degrees on each side of the swing space. The pendulum swings from movement of the portable frame. In some applications, the frame can be fixed to a person or animal, e.g., on an arm or leg. Movement of the arm or leg generates a periodic waveform, e.g., at 15 volts.

In some applications, the pendulum coil 80 is mounted in a stationary frame. The periodic swings can be powered by a gravity pull similar to mechanisms found in a wall-mounted clock. The force of this mechanism can be adjusted to provide a constant run time of hours sufficient to charge several small USB connected devices. In some examples, the mechanism can generate 2 watts of charge energy at a 10 to 15 volts amplitude of alternating waveforms.

Reverse Escapement Kinetic Power Source Embodiment

Figure 11A:
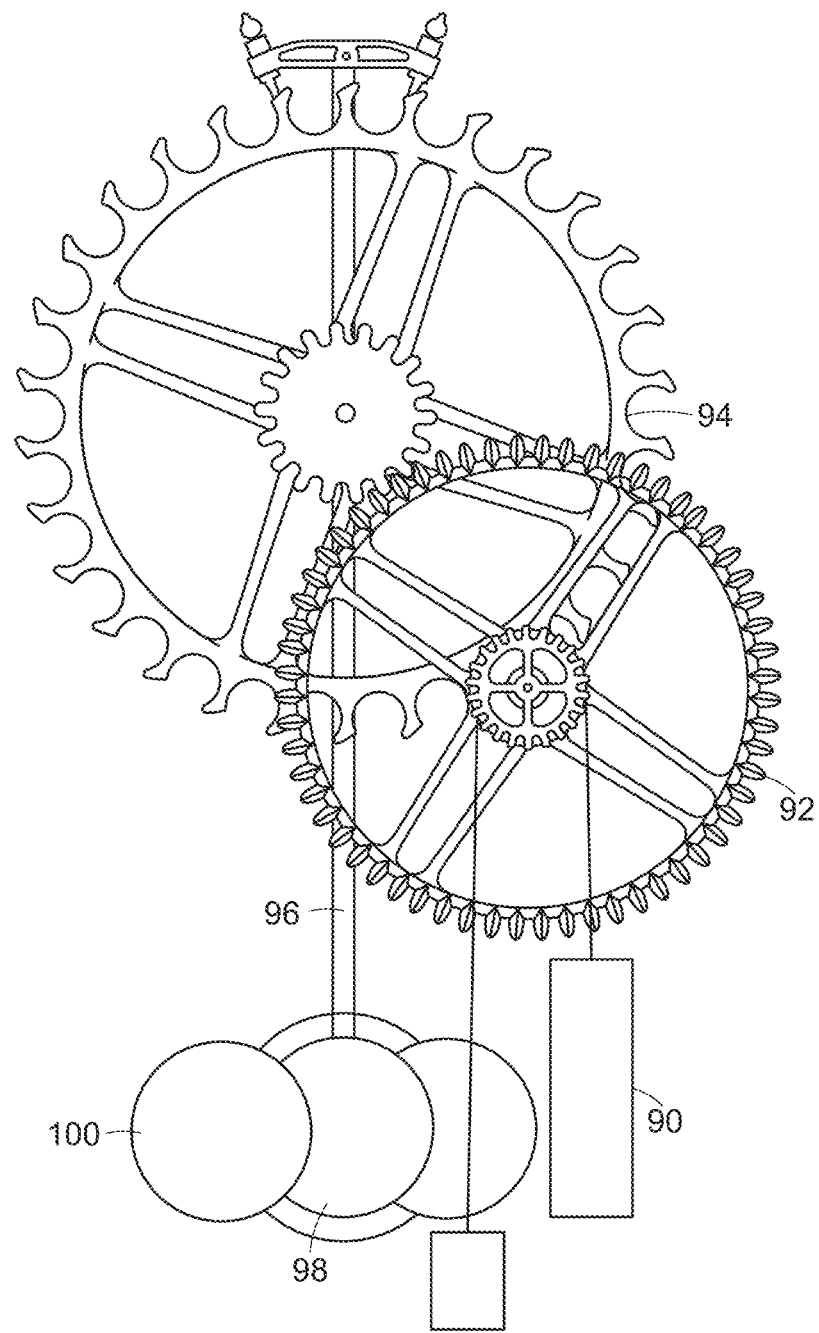
FIGS. 11A-11C illustrate an exemplary stationary device for kinetic energy harvesting in accordance with one or more embodiments, where the kinetic power source is a reverse escapement mechanism.
Figure 11C:
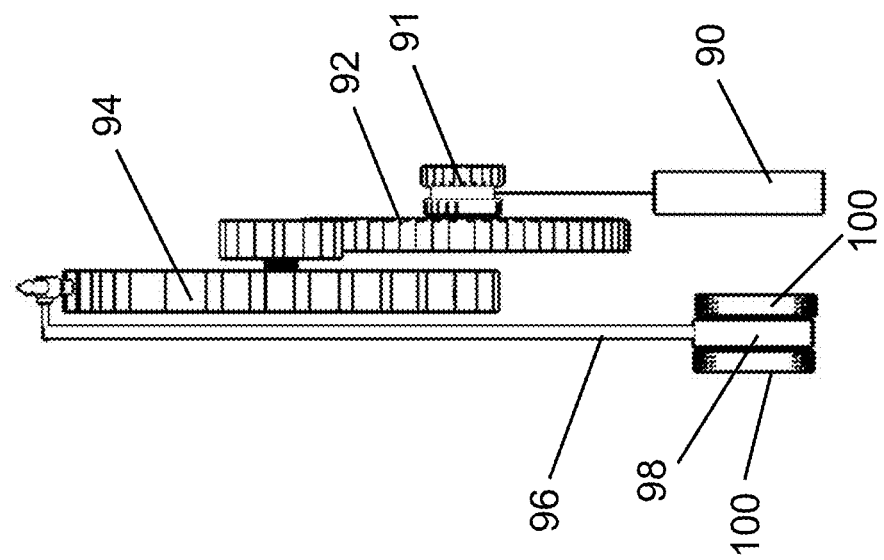
Figure 11B:
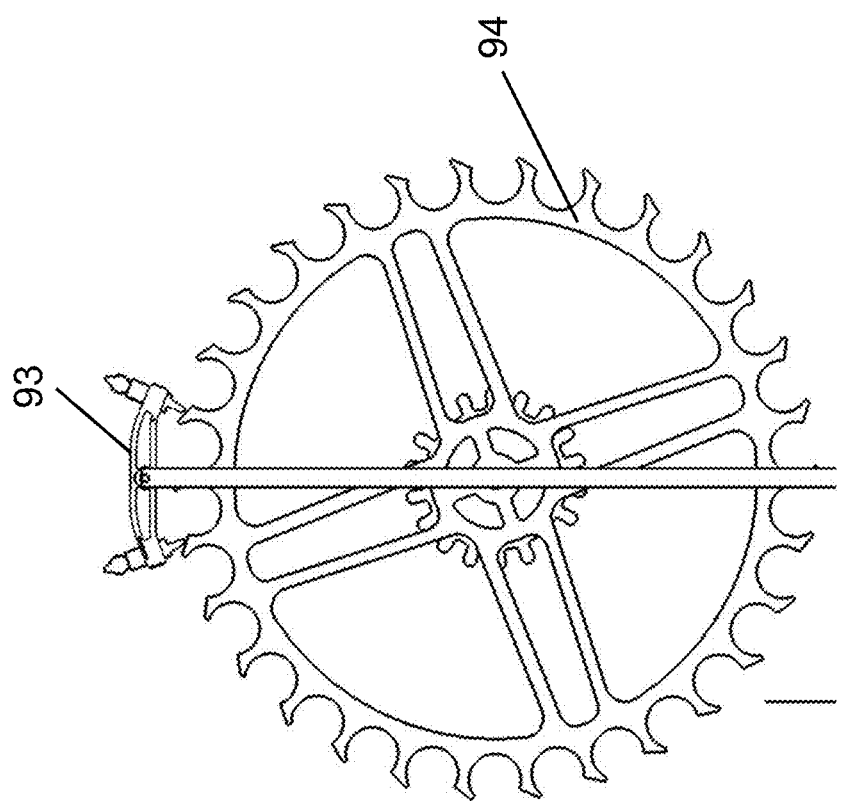

FIGS. 11A-11C illustrate an exemplary stationary device for kinetic energy harvesting in accordance with one or more embodiments, where the kinetic power source is a reverse escapement mechanism. A weight 90 pulls a gear 92 fixed to an escapement wheel 94 depending in a vertical path over a period of time, e.g., one hour, creates a constant kinetic force to keep a pendulum 96 in motion. The coil 98 at the end of the pendulum 96 generates electric energy while swinging through stationary magnetic fields of fixed permanent magnets 100.

The escapement receives its kinetic energy from the vertical descending weight 90. The timing of the pendulum swings are dependent of the length of the pendulum, its weight (the coil at the end of the pendulum shaft), and the swing controlled by the escapement wheel gaps. In one example, the design yield two swings per second, generating four full cycles of over 5 volt spikes each swing cycle. This device generates electric energy as long as the vertical weight 90 is descending on its fixed vertical path.

FIG. 11B is an enlarged rear view of the escapement wheel 94. FIG. 11C is a side view of the device. The downward force of gravity from the pulling of the weight 90 is converted by a ratchet wheel 91 into a rotational motion. Its torque drives the timing wheel 94 through the gear train combination wheels. The escapement-yoke 93 at the center of the pendulum top is notched by the timing notches of the timing wheel 94.

The pendulum swings move the coil 98 at the bottom of the pendulum 96 between two or more magnets 100. The magnet pairs are spaced to provide a gap for the coil 98 to swing through. Electric energy is generated each time the winding of the coil 98 breaks the magnetic field of magnet pairs in its path.

The torque through the ratio to the gear train is scalable to adapt the device to large size coil-magnet combinations. The device can be scaled-up, e.g., to charge large capacity 2-Volt Lead Iron battery cells overnight. In one embodiment, the torque through the ratio of the gear train can be adapted to drive a conventional alternator to produce electrical energy.

FIGS. 24A and 24B illustrate an exemplary alternate stationary device 400 for kinetic energy harvesting in accordance with one or more embodiments, where the kinetic power source is a reverse escapement mechanism. As with the FIGS. 11A-11C embodiment, a weight 90 is pulled by gravity. The downward force of gravity is converted by a ratchet wheel 92 into a rotational motion.

The torque through the gear train combo wheels is scalable to longer periods of operation. The device can be used to charge connected mobile devices and larger batteries (e.g., large capacity 2-Volt lead iron battery cells) overnight.

Circuit for Processing Current from Kinetic Energy Harvesting Devices

Figure 12:
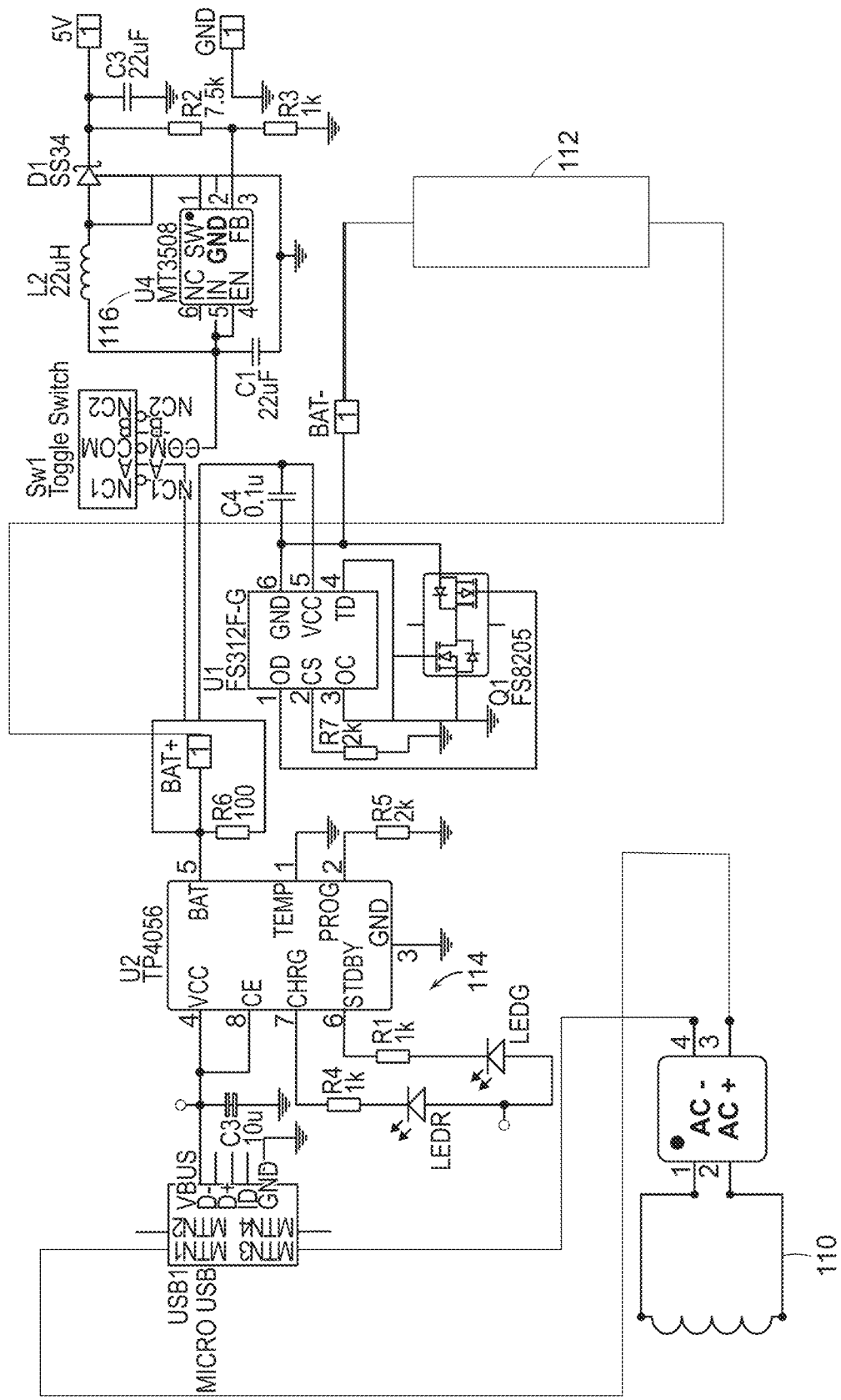
FIG. 12 illustrates an exemplary circuit including a rectifier and battery that can be connected to an energy harvesting device in accordance with one or more embodiments.

The motion of the coil elements in the harvesting devices discussed above induces negative and positive pulses into the coil. The coil ends are electrically connected to the circuit 110 shown in FIG. 12, which includes a simple diode bridge. The bridge converts the alternating current generated by the motion device to DC voltage approximately at 10 to 13 volts. A battery (e.g., a lithium battery) 112 or capacitor is connected to the bridge via a protection circuit 114. The protection circuit 114 regulates the voltage variation supplied from the AC to DC rectifier bridge 110. An LED indicator in the circuit can show the charge status of the battery 112. The circuit can switch, e.g., 4.5 volts to the USB interface 116, which can be connected to a portable electronic device like an iPhone to charge the device or sustain operation of the device.

The protection circuit 114 comprises a charger board (e.g., a TP4056 charger board) input terminal connected to the rectifier bridge for sensing any voltage level above 2V. It trickle charges the battery 112 connected the B+ and B− port of the circuit. This circuit 114 prevents overcharging. The circuit 114 automatically monitors charge current and voltage. An indicator LED indicates charging and completed charging if the voltage level has reached 4.5 volts at the b terminal of the board.

The USB device 116 on the power supply converter board provides a regulated charge voltage of exactly 5V suitable to charge iPhone or android or other portable electronic devices. Voltage present at the +− port of the TP 4056 or B terminal between 2 volts or 26 volts is switched to the output +/− port at 4.5 volts regulated. Consequently, the USB device gets power either from the battery 112 or the directly from the rectifier power source. Ideally, charging is performed when the battery 112 and the circuit LED indicates a fully charged state.

The voltage from the bridge 110 is monitored and switched by the overcurrent protection circuit 114, and switched to the battery 112. The circuit 114 determines the charge of the battery 112. If battery 112 is less than fully charged, the circuit 114 applies the voltage from the circuit 110 to the terminals of circuit 116 connected to the battery 112. A red light in circuit 114 indicates that charging of battery 112 is in progress. The charging-in-progress indicator in circuit 114 will turn green as soon as the battery 112 is fully charged. The overcurrent protection circuit 114 monitors the voltage level of the battery 112. To prevent overcurrent conditions, the circuit 114 will switch off the path from the circuit 114 battery terminal to the circuit 114 Volt out. This will protect the battery 112 and step up function in circuit from overcurrent conditions.

The circuit 110 can be a simple rectifier bridge 7G DB107. This bridge is connected to each coil. The circuit 114 logic determines if the voltage levels have reached a level of 4.5 volts, but not greater than 5 volts. The circuit of 114 steps down any voltage level exceeding 5 volts.

Power Management System

Figure 13:
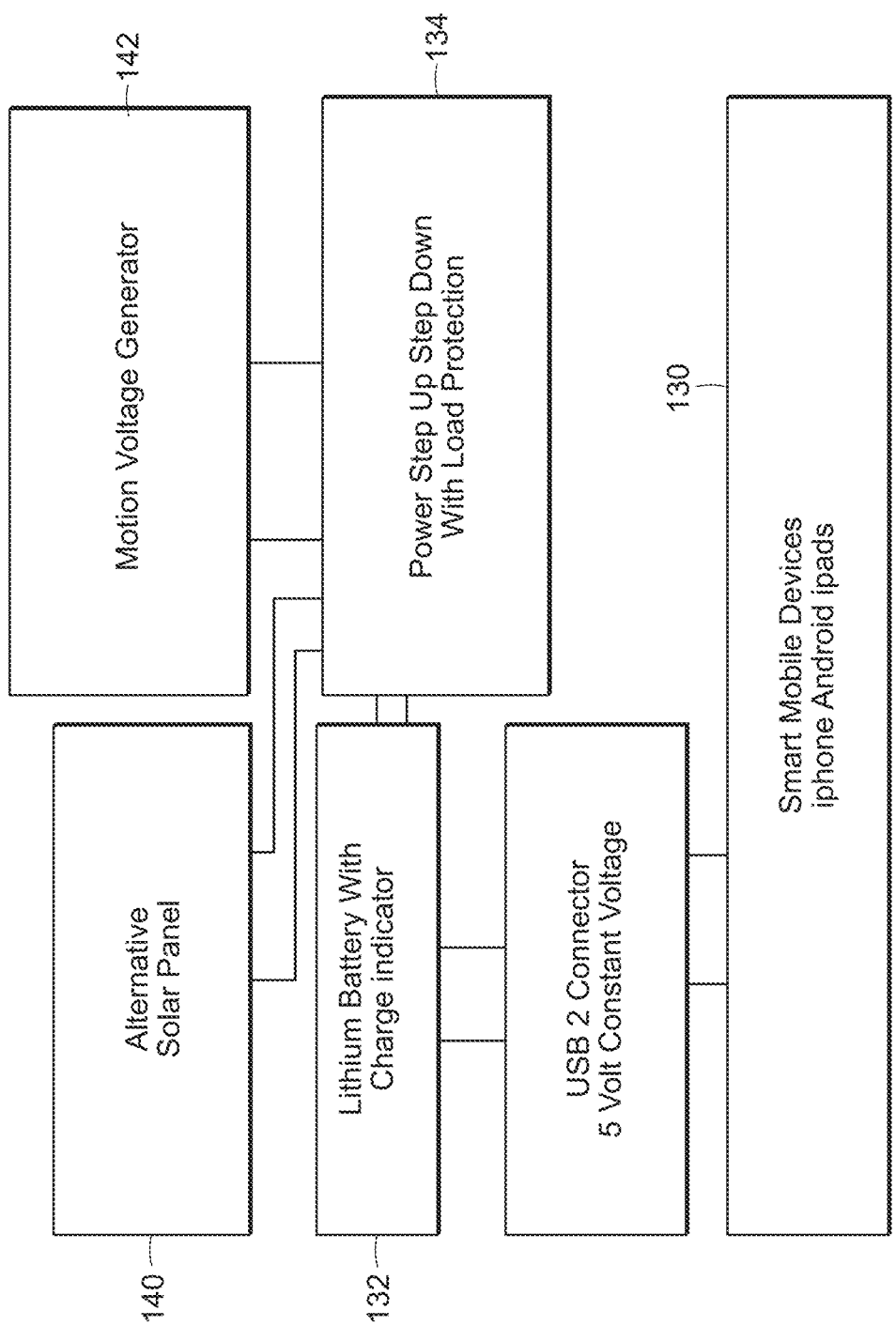
FIG. 13 is a block diagram of an exemplary kinetic energy harvesting device in accordance with one or more embodiments.

FIG. 13 is a functional block diagram of an exemplary power management system for a kinetic energy harvesting device for charging a portable device 130 in accordance with one or more embodiments. The system includes an EM-Power-0007 enhanced USB 5V 1 A 18650 Lithium Battery 132 and a TP4056 Charging Board 134. When voltage is present at the TP4056, it charges the attached lithium battery 132 attached to the b+ and b− terminals. This circuit has a DW01-P IC protecting the lithium battery 132 from overcharging.

Figure 14:
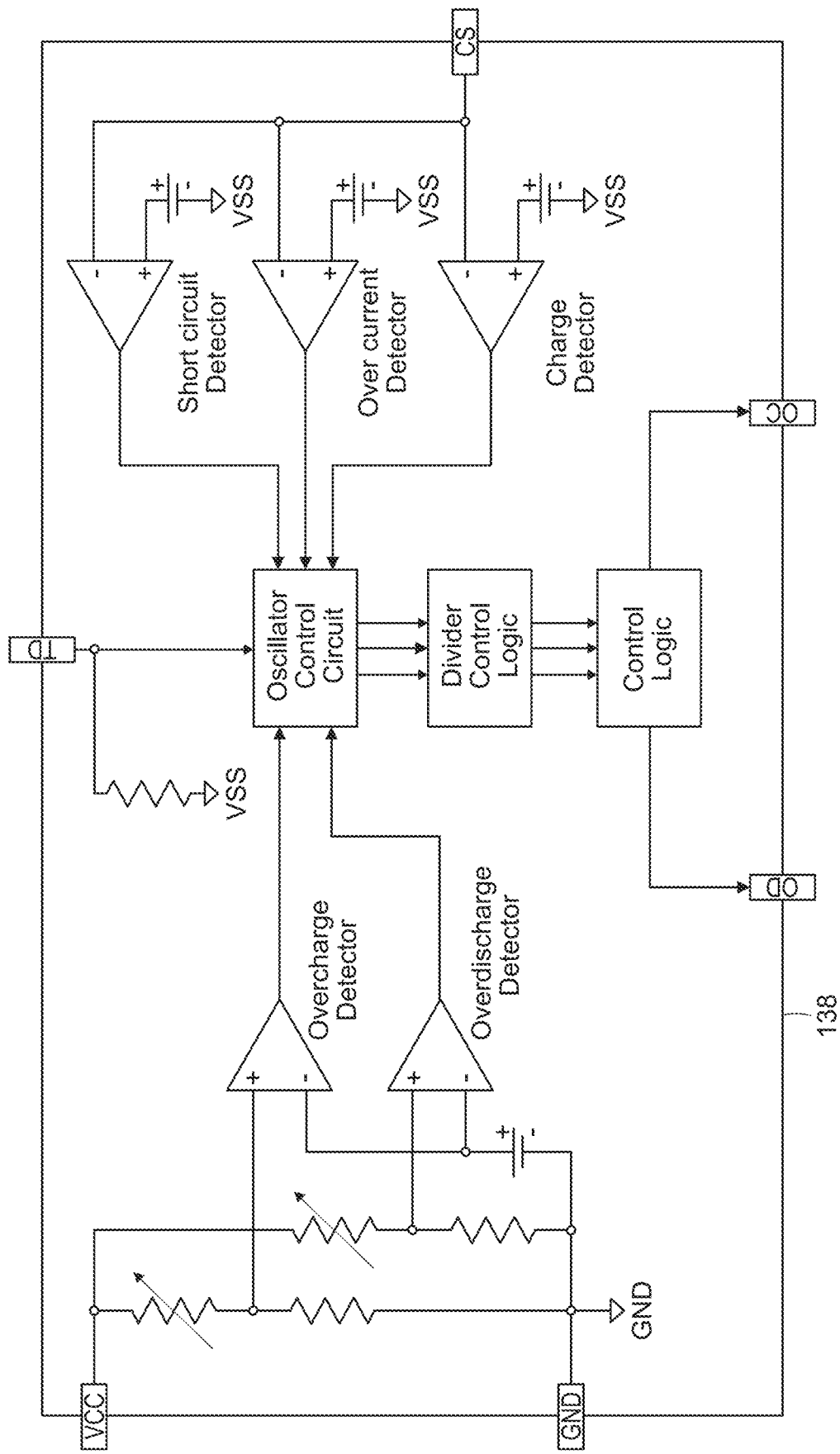
FIG. 14 is a block diagram of a power step up/step down circuit with load protection in accordance with one or more embodiments.

FIG. 14 is a block diagram of the IC 138. The EM-0007 monitors the charge status of the battery 132 and shows the green when the battery is fully charged. A unique feature of this particular design is the power source is generated by renewable energy either solar power through a solar panel 140 or motion generated induction coil from device 142.

Moving Cylindrical Coil on a Cylindrical Magnet Array Embodiment

Figure 15:
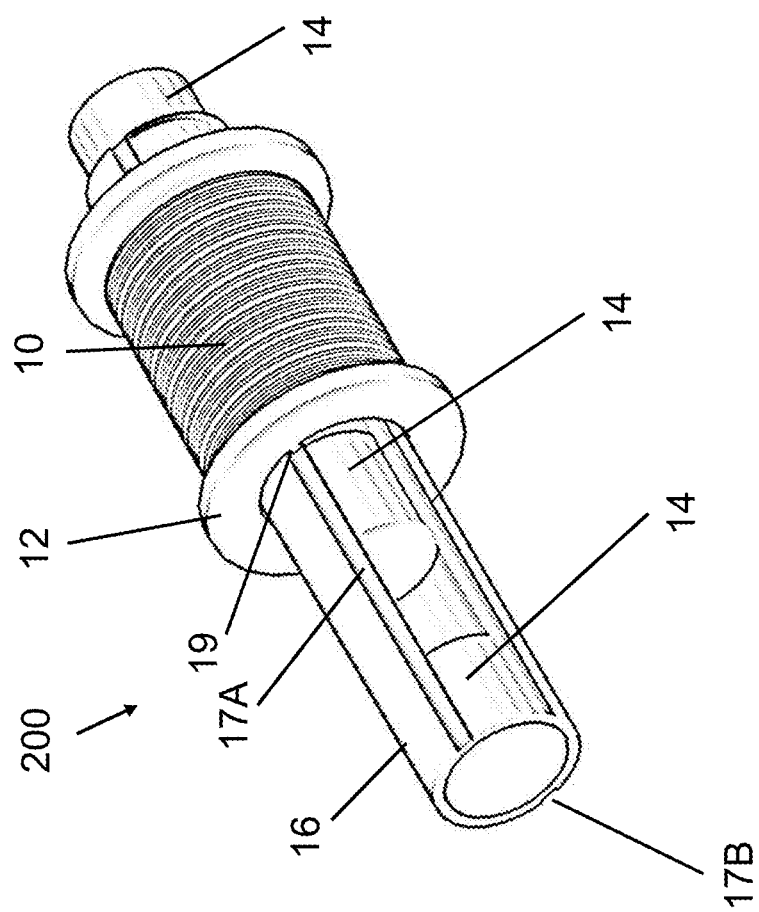
FIG. 15 illustrates an exemplary kinetic energy harvesting device with a moving cylindrical coil mounted on a cylindrical magnet array in accordance with one or more embodiments.

FIG. 15 illustrates an exemplary kinetic energy harvesting device 200 with a moving cylindrical coil on a cylindrical magnet array in accordance with one or more embodiments.

In this embodiment, a wire coil 10 is wound around a tubular element 12 that is arranged concentrically around a cylindrical shaft 16.

One or more cylindrical magnets 14 are positioned inside the shaft 16 in a spaced-apart arrangement.

The wire coil 10 harvests electric energy from kinetic energy as it moves along the shaft 16 across the cylindrical magnets 14. A burst of electric current is generated as the coil 10 moves across each magnet 14. The motion of the coil 10 induces negative and positive pulses into the coil. The coil 10 is electrically connected to one or more power management circuits (previously described) that regulate, rectify, and provide a balanced voltage feed.

As shown in FIG. 15, the outer wall of the cylindrical shaft 16 includes two grooves 17A, 17B on opposite sides of the cylindrical shaft 16. The grooves 17A, 17B are lined with diamagnetic foils. In one embodiment, the foils are 0.4 mm copper foils embedded in the grooves 17A, 17B.

One end of the wire coil 10 is electrically connected by a conductive element 19 to the conductive copper foil in groove 17A. The other end of the wire coil 10 is electrically connected by a similar conductive element to the conductive copper foil in the groove 17B. The conductive elements 19 at the ends of the wire coil 10 can comprise 0.3 mm tongues matching the magnet shaft groves. The touching surfaces of the tongues can be fitted with thin diamagnetic foils. The tongues glide along the conductive surfaces of the grooves 17A, 17B, thereby electrically connecting the moving coil 10 constantly to the outside electronics.

The outer surface of the shaft 16 and the inner surface of the tubular element 12 facing the shaft are preferably micro polished to reduce friction.

Figure 16:
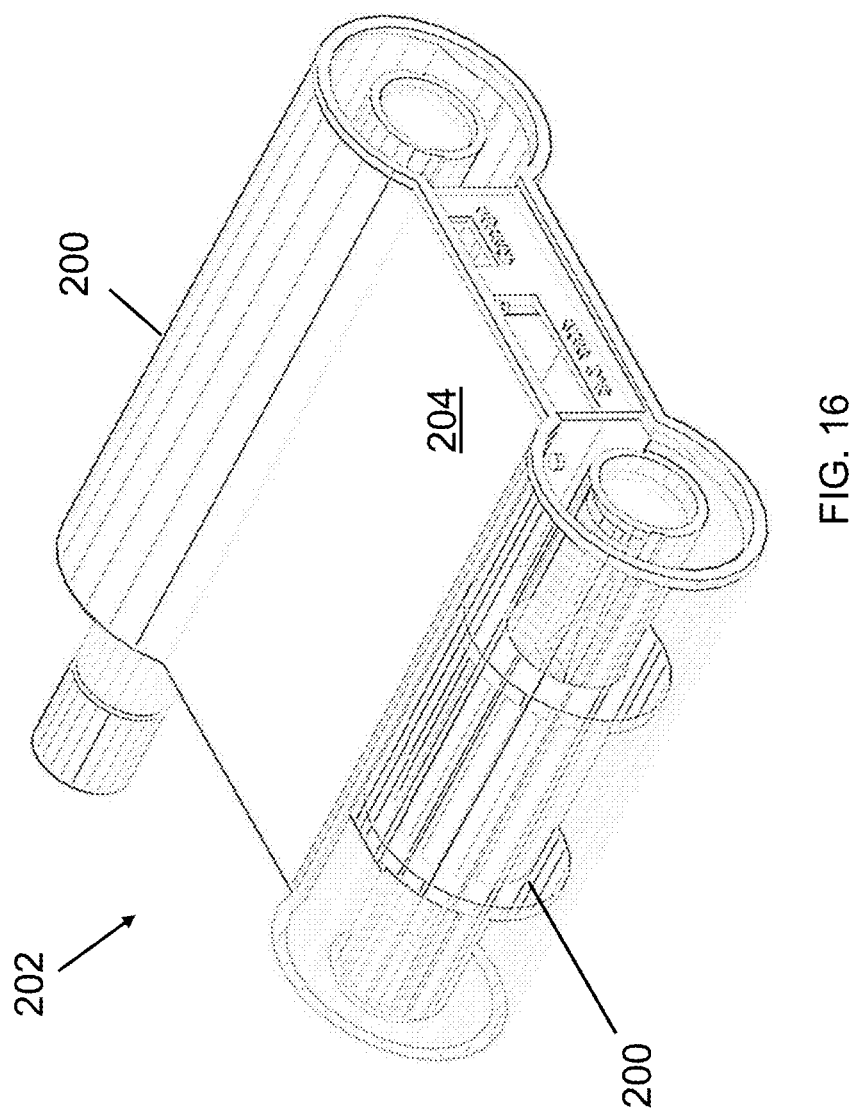
FIG. 16 illustrates an exemplary apparatus including two kinetic energy harvesting devices of FIG. 15 in accordance with one or more embodiments.

FIG. 16 illustrates an exemplary kinetic energy harvesting device 202 in accordance with one or more embodiments, which incorporates two of the FIGS. 15A and 15B devices 200 in a housing 204. Power management electronics and a battery are located in the housing 204.

Figure 17:
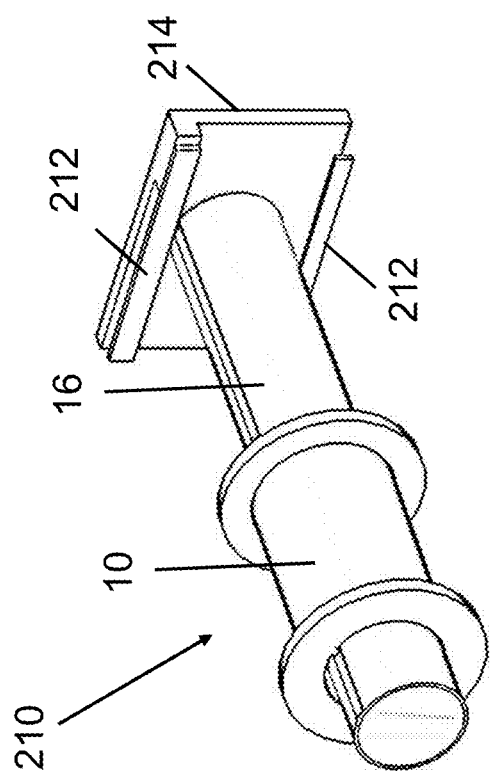
FIG. 17 illustrates an exemplary kinetic energy harvesting device having piezo electric elements in accordance with one or more embodiments.

FIG. 17 illustrates an alternative exemplary kinetic energy harvesting device 210 in accordance with one or more embodiments. The device 210 is similar to the device 200 of FIG. 15, further includes one or more piezo electric elements 212 fitted in an endplate 214. Only one endplate 214 is shown in the figure. However, endplates with piezo electric elements 212 may be installed at both ends of the moving coil path. Each time the moving coil 10 on shaft 16 impacts the piezo electric elements 212, an additional electric pulse is generated by the piezo electric elements 212 and is routed directly to the power management unit.

The piezo electric elements can be incorporated in any of the embodiments disclosed herein for increasing electric output.

Figure 18:
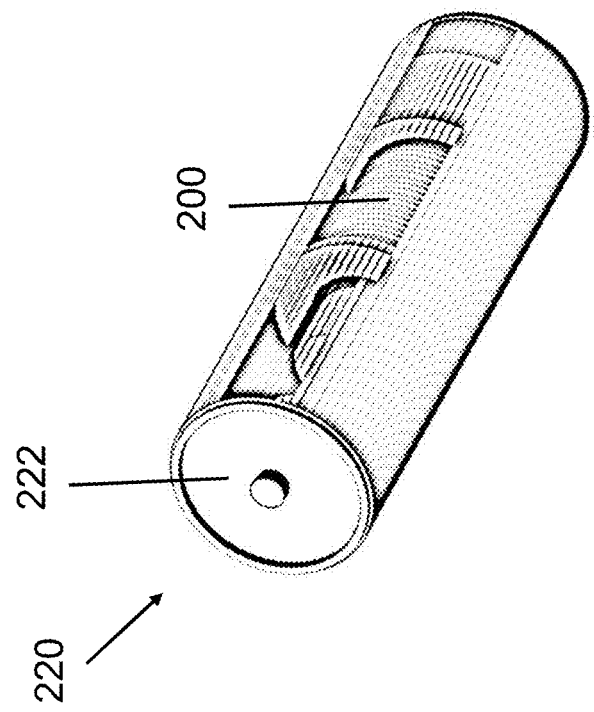
FIG. 18 illustrates an exemplary kinetic energy harvesting device in a battery-shaped housing in accordance with one or more embodiments.

FIG. 18 illustrates an exemplary kinetic energy harvesting device 220 in accordance with one or more embodiments, which incorporates the device 200 of the FIGS. 15A and 15B in a battery-shaped housing 222. Power management electronics and a battery are located in the housing 222. The housing 222 is sized and shaped like a battery, which can be of various sizes including, but not limited to, a D-size battery or a B-size battery. In one exemplary application, the energy-harvesting device can be installed in a standard flashlight using batteries. The device stores kinetic energy to power an LED in the flashlight.

Harvesting Device with Rolling Wire Coil Embodiment

Figure 19B:
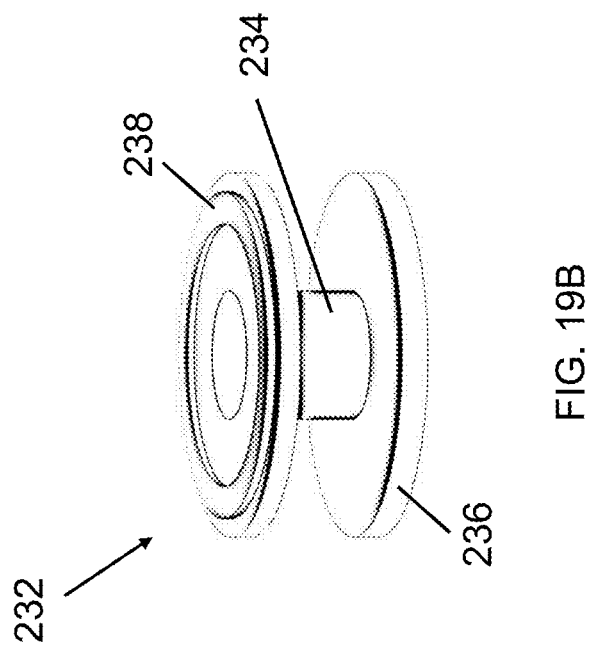
FIGS. 19A and 19B illustrate an exemplary kinetic energy harvesting device having a rolling wire coil element in accordance with one or more embodiments.
Figure 19A:
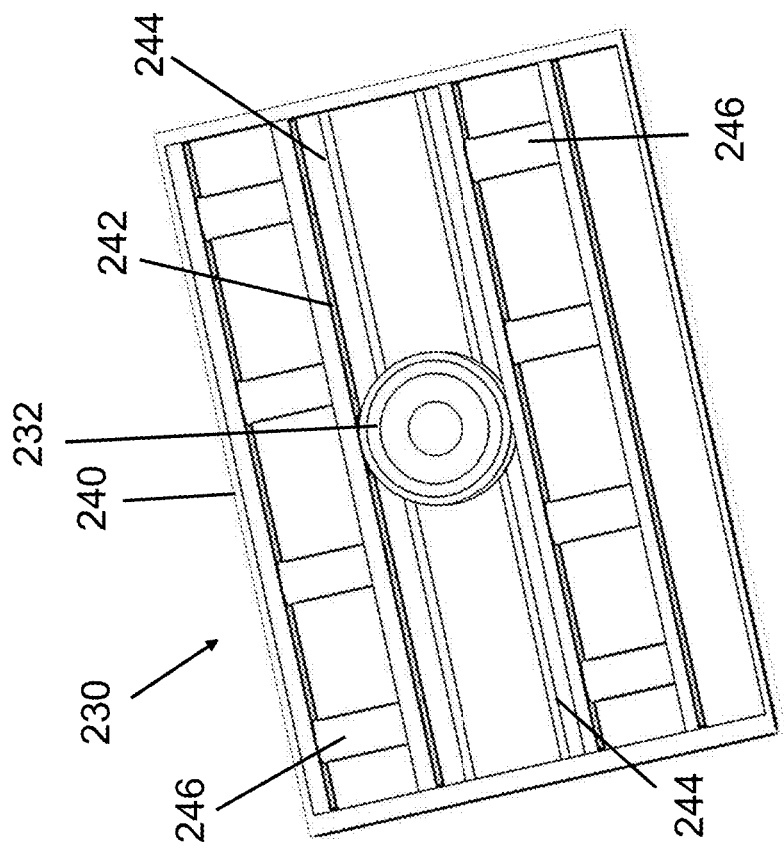

FIG. 19A illustrates an alternative exemplary kinetic energy harvesting device 230 in accordance with one or more embodiments. The device 230 includes a rolling wire coil device 232 shown in further detail in FIG. 19B. The rolling wire coil device 232 includes a wire coil (not shown in the figure for ease of illustration) wound around a tubular element 234 having two side disks 236. Each disk 236 includes a thin ring of diamagnetic conducting foil 238, which can be, e.g., 0.4 mm thick. The opposite ends of the wire coil are electrically connected to different diamagnetic conducting foil rings 238.

The device 230 includes a housing 240, which includes rails 242 on which the rolling wire coil device 232 can roll back and forth. The housing also includes conductive tracks 244 on opposite sides of the housing, which are in constant contact with the conducting foil rings 238 of the coil device 232 as the coil device rolls 232 back and forth in the housing. The rails 242 serve as connecting elements to connect the wire coil to the power management electronics.

The contact surfaces of the housing and the coil device 232 are highly polished to reduce friction.

The housing 240 also includes a set of magnets 246, which are preferably equally spaced apart. The magnets can be cylindrical shaped magnets. Electric energy is induced as the coil rolls freely past the magnets.

As with other embodiments, the ends of the coil chamber in the housing can be equipped with piezo electric elements 248 that convert the impact energy of the moving coil into additional electric pulse energy.

Wireless Charging Feature

Figure 20A:
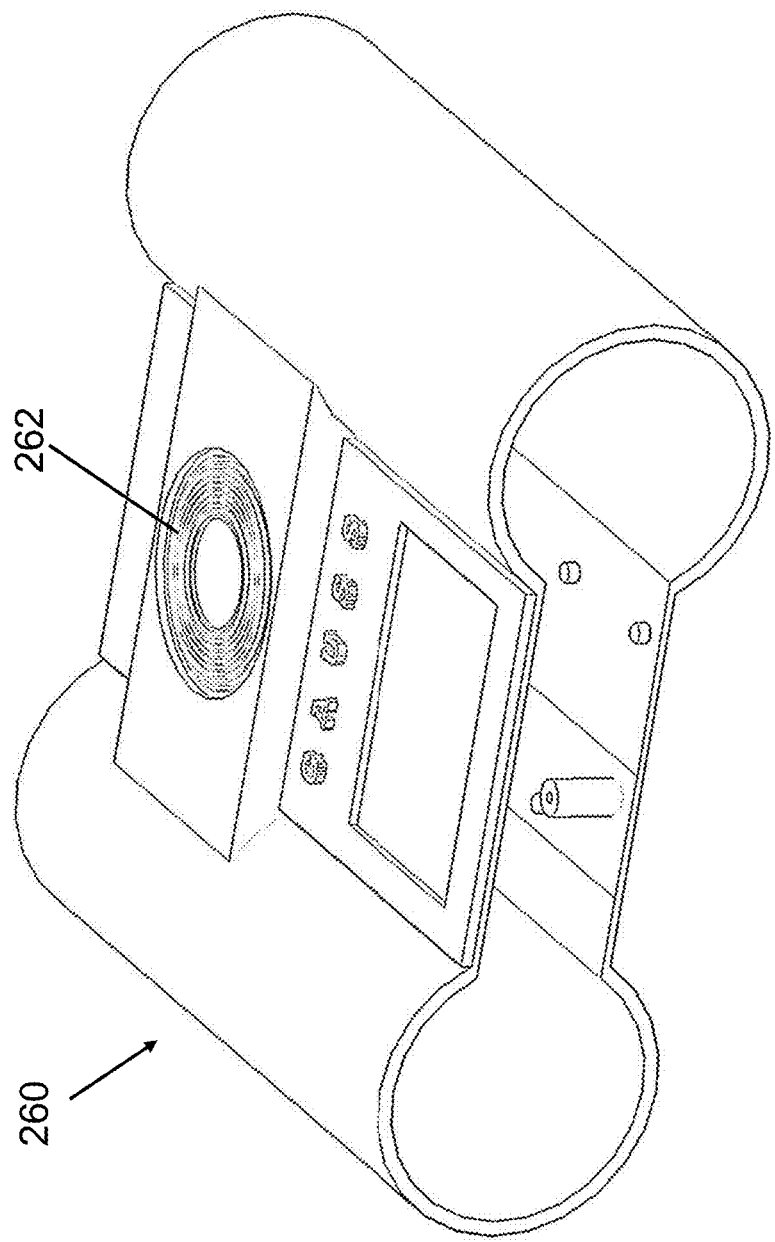
FIGS. 20A-20C illustrate an exemplary kinetic energy harvesting device housing having a wireless charging interface in accordance with one or more embodiments.

Kinetic energy harvesting devices in accordance with various embodiments can be configured to provide wireless power transfer using inductive charging to charge compatible electronic devices. FIG. 20A depicts the housing 260 of an exemplary harvesting device having a Qi wireless charging coil transmitter 262. The transmitter 262 is part of a transmitter circuit (discussed below), which is connected to the internal power management circuit. A user simply places her/his device with a Qi charge receiver on Qi wireless charging transmitter 262 in the housing 260 to charge the device.

Figure 20C:
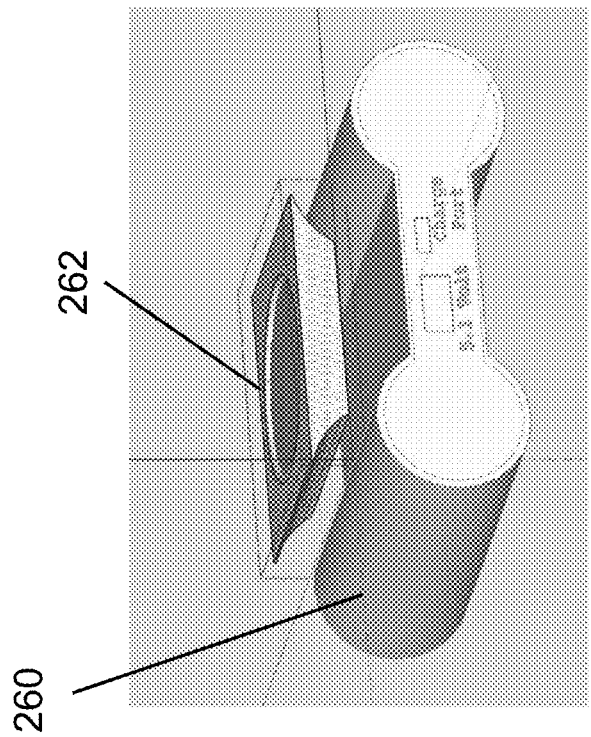
Figure 20B:
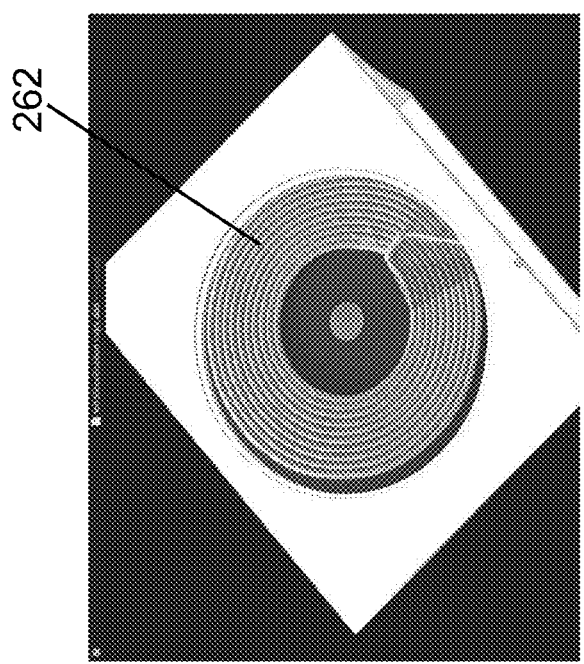

FIGS. 20B and 20C depict an exemplary removable Qi wireless charging transmitter 262 in accordance with one or more embodiments. The transmitter 262 is detachably attached to the housing 260 of the charging device. The transmitter 262 can be removed, if desired, and conveniently snap onto the back of a device being charged, e.g., it can magnetically couple to the back of an iPhone 12 housing using the MagSafe charging feature.

The removable Qi wireless charging transmitter 262 can be incorporated into any of the charging devices disclosed herein.

In one or more embodiments, the maximum output of the wireless charger is about 5 W, which is sufficient to charge most smartphones, providing a 1000 mA charge at 5 V on the other side of the wireless connection. The wireless charger can have a charging distance of about 2-8 mm, and can work with any Qi charge receiver.

Figure 21:
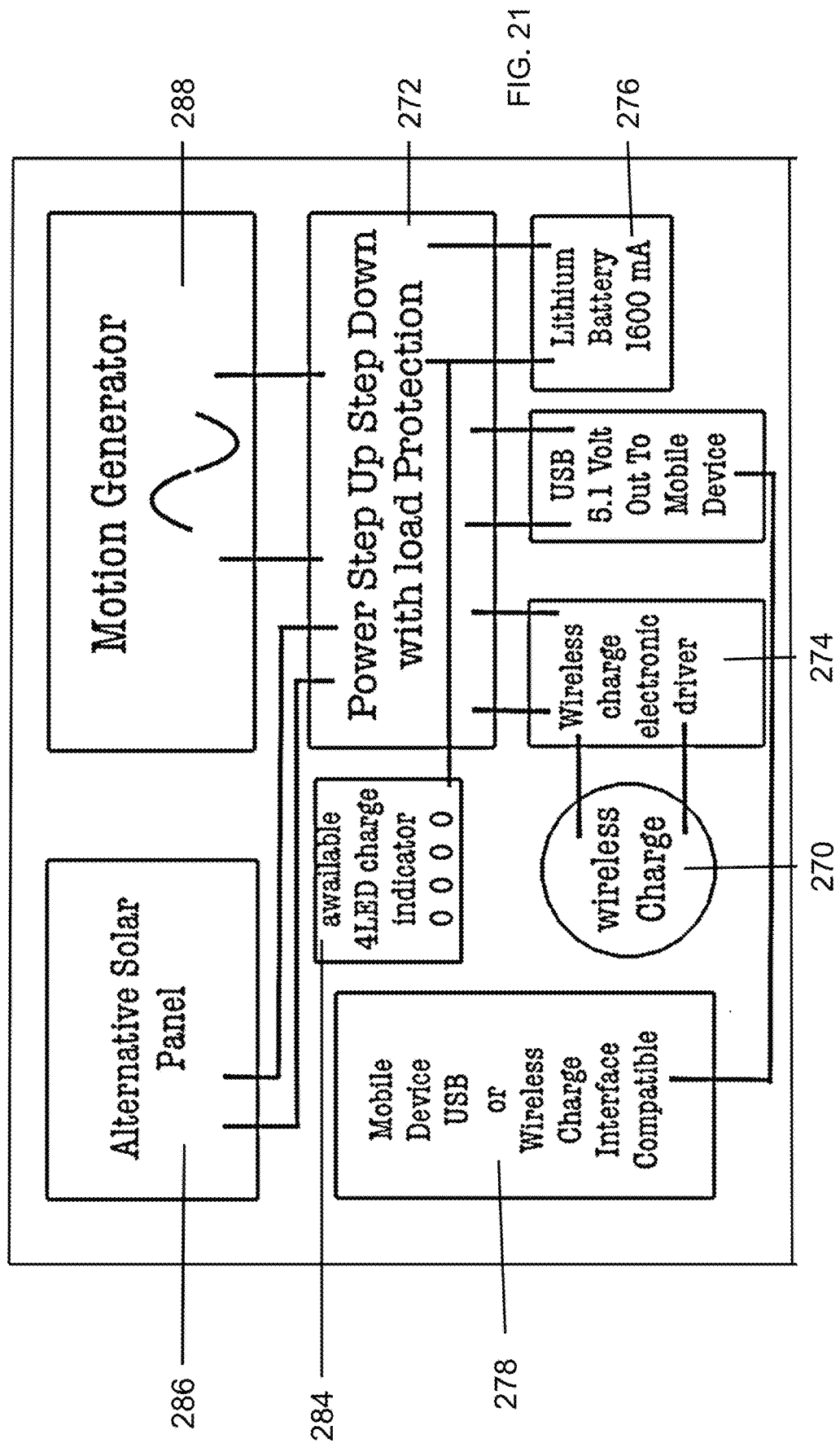
FIG. 21 is a simplified diagram illustrating implementation of a wireless charging interface in a kinetic energy harvesting device in accordance with one or more embodiments.

FIG. 21 is a simplified diagram illustrating an exemplary enhanced power management circuit featuring a wireless charge interface in accordance with one or more embodiments. A wireless charge circuit 270 with the wireless charge transmitter 262 is connected to a power step up step down circuit 272. A wireless charge electronic driver circuit 274 only powers the wireless charge circuit 270 when a target device is present and sensed by the wireless charge circuit 270. This prevents power consumption by circuit 270 from the power back lithium battery 276.

The circuit 270 and the wireless charge transmitter coil 262 allow compatible mobile devices with a wireless charge interface to consume charge energy from the backup storage battery 276. This design compliments wired charge connection via USB port 278 to the mobile device.

As shown in FIG. 21, an optional solar panel can provide electric current to the power step up step down circuit along with kinetic energy harvesting device 288.

By way of example, the wireless charger can have the following technical specification:
Input: 5V
Input Current: 2 A
Maximum output power of 5 W
Operating Frequency: 100-200 kHz
Charging Distance: 2-8 mm
Charging Plate Dimensions: 53 mm×53 mm×4 mm/2.1"× 2.1"×0.2"
PCB Dimensions w/Components: 55 mm×37 mm×6 mm/2.2"×1.5 mm×0.2"
Weight: 47 g The wireless charging feature can be incorporated in any of the devices disclosed herein.

In accordance with one or more embodiments, the power management system includes two DC-Out terminals to connect to devices being charged or powered. The system also includes ports for connecting the to the motion generator 288. In addition, the system includes an additional DC-In port, which can comprise a barrel connector. This DC-In port allows the system to receive power from an additional 5-12 Volt power source, which can comprise, e.g., the solar panel 286.

Li-Ion/Li-Polymer Battery Charge Management Controller

In accordance with one or more embodiments, a Li-Ion/Li-polymer battery charge management controller is included in the exemplary kinetic energy harvesting devices disclosed herein to keep the buffer Lithium Polymer (LiPoly) or Lithium Ion (LiIon) rechargeable batteries topped up. The charge management controller enables batteries to be effectively charged using a variety of sources including, e.g., USB, DC, or Solar power, with a wide 5-10V input voltage range. The charge management controller is a smart controller that reduces the current draw if the input voltage starts to dip under 4.5V, making it a perfect near-MPPT solar charger that can be used with a wide range of sources. This circuit works well for plain USB or DC trickle charging—the use of 5V or 9V chargers accommodates the voltage variation provided by motion generators.

One example of a suitable Li-Ion/Li-polymer battery charge management controller is the MCP73871 controller available from Microchip Technology Inc. This controller has been found to be particularly useful in managing effective trickle charging of lithium batteries from power sources like the kinetic energy harvesting devices that deliver random frequent energy bursts with variation in duration, frequency, and voltage level, and do not provide a constant voltage or constant current.

Gravity Pendulum Motion Generator Embodiment

FIG. 22 illustrates an alternative exemplary kinetic energy harvesting device 300 in accordance with one or more embodiments. The device 300 has a pendulum design comprising a wire coil 302 (functioning as a pendulum bob) attached to the end of a rod 304. The rod can be, e.g., a thin brass tube 306 that has a very small mass but is strong enough not to stretch appreciably. The linear displacement from equilibrium is S. The length of the arc 310 has magnet pairs 312 equally spaced over the length of arc S. The wire coil swings through the gap between each magnet pair 312. There is a net force of mg sin(O) on the wire coil bob 102 toward the equilibrium position at the center of the arc, i.e., a restoring force.

The pendulum device 300 is highly sensitive to a displacement of its equilibrium position. This device 300 takes advantage of the physical behavior of a simple pendulum, and can harvest horizontal motions and resulting displacements from the equilibrium position. The pendulum motion follows arc 310. The wire coil 302 breaks the magnetic fields of the arced magnet arrays 312 and generates multiple energy pulses.

The device 300 includes optional piezo electric elements 320 at opposite ends of the swing path 310. The impact energy generates an additional electrical energy pulse to increase the electrical energy harvested by device 300.

The pendulum device 300 can be scaled to match particular spaces in which the device can be placed. For example, as depicted in FIG. 23, multiple pendulum devices 300 can be placed in various locations of a motor vehicle 330 including, e.g., inside doors, bumpers, and the hood of the vehicle. Each device 300 is placed in a location and oriented to maximize horizontal displacements of "S" from back and forth vibrations and sideways vibrations.

Levitation Enhanced Magnet Shaft Embodiment

FIGS. 25A-25D illustrate an alternative exemplary kinetic energy harvesting device 500 in accordance with one or more embodiments. The device 500 includes two tubes 502 (shown in detail in FIG. 25D), each having multiple fixed coils 508. A magnet 510 moves back and forth through the tube 502. The magnetic field of magnet 510 breaking the windings of the coils 508 induces electric energy in the coils.

A levitation magnet 504 moves freely (e.g., by rolling or sliding) through a chamber 506, which extends between the ends of the two tubes 502. In this embodiment, the chamber 506 is substantially orthogonal to the tubes 502. The magnet 504 has opposite polarization to the magnets 510 moving through the tubes 502.

Motion of the magnet 504 is excited by its imbalance to the center of gravity. The tilt angle, degree of tilt, and the inertia of the device with respect to the earth's center of gravity will cause the magnet 504 to move. The magnet 504 will react to small amounts of motion energy when carried, e.g., in a pocket and the chamber is oriented down below the rest of the device.

Each time the levitation magnet 504 nears the end of its path in the chamber 506, it will it will dynamically levitate the magnet 510 in one of the magnet tubes 502 and cause a kick-type of motion of magnet 510 upward away from the bottom of the device to the top. Gravity will then force the magnet 14 back down towards the bottom end of the tube 502. The motion harvest events are trigger by the small device tilts, and no external power source is required to set the levitation magnet 504 in motion. The magnet 504 amplifies motion of the magnets 510.

Figure 25E:
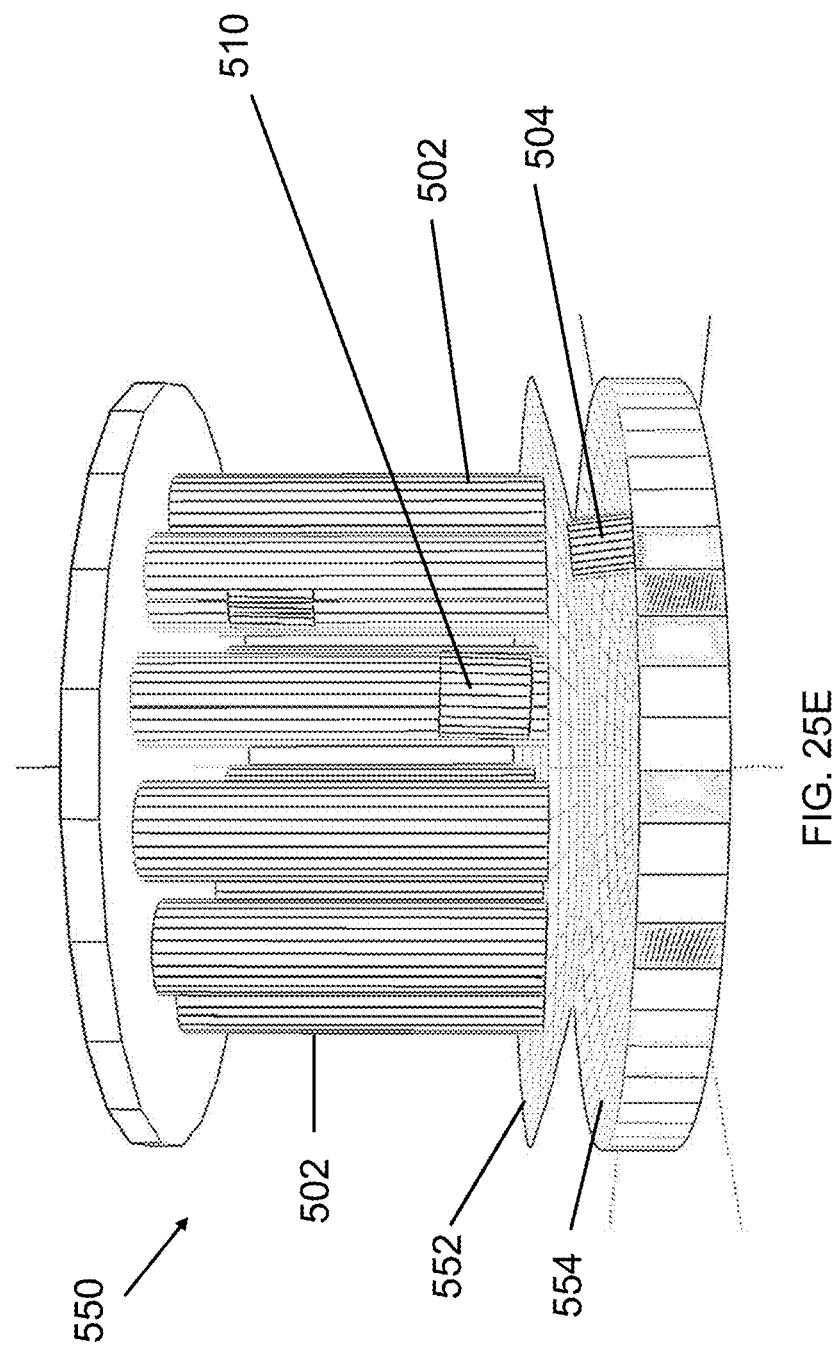
FIG. 25E illustrates another exemplary kinetic energy harvesting device having multiple tube structures with fixed coils and moving magnets in accordance with one or more embodiments.

FIG. 25E illustrates another alternative exemplary kinetic energy harvesting device 550 in accordance with one or more embodiments. The device 550 includes a plurality of tubes 502 of the type shown in FIGS. 25A-25D. Each tube has multiple fixed coils 508, and a magnet 510 moves back and forth through the tube 502 to generate electric energy in the coils.

The tubes 502 in the FIG. 25E embodiment are arranged in a circular pattern on a base formed by two parabolic plates 552, 554. A cylindrical-shaped levitation magnet 504 can slide freely in the space between the two parabolic plates 552, 554.

Any imbalance or movement of the plates relative to the center of gravity will cause the levitation magnet 504 to move to the new point now aligned with the true center of gravity. The pivot point design of the device 550 will cause the levitation magnet 504 to reposition itself by a very small motion. The kinetic energy of minute motion of the magnet 504 will cause an amplified levitated movement of the magnets 510 in the tubes 502 to generate highly effective electrical energy pulses, as magnet 504 moves about on the parabolic surface 554.

Figure 25G:
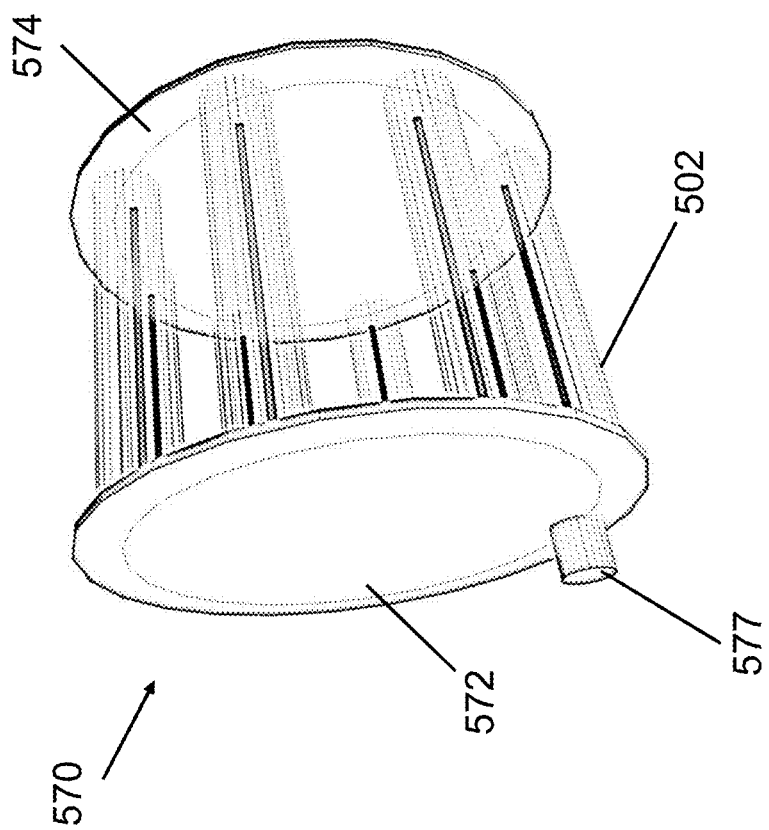
FIGS. 25F and 25G illustrate another exemplary kinetic energy harvesting device having multiple tube structures with fixed coils and moving magnets in accordance with one or more embodiments.
Figure 25F:
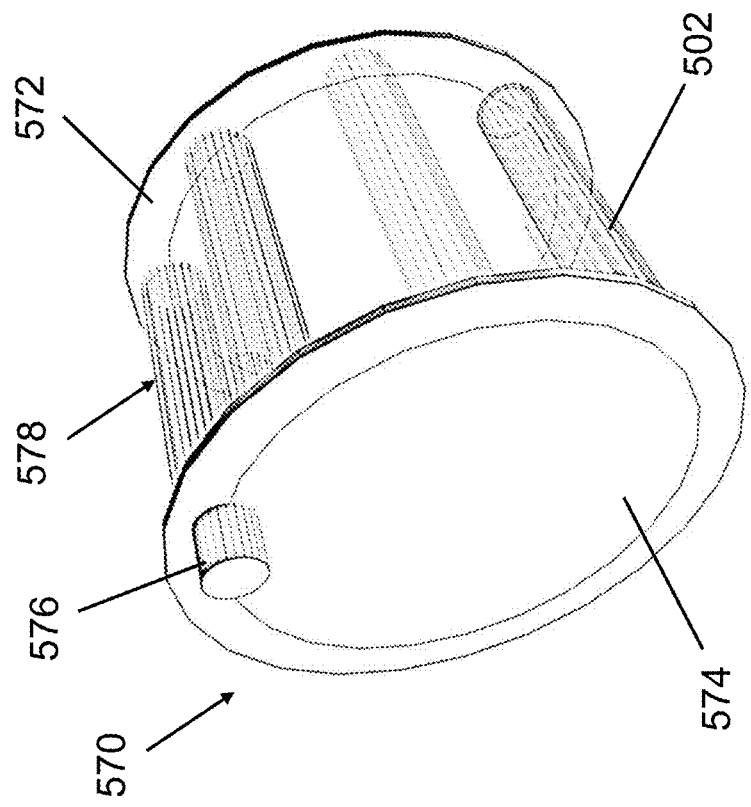

FIGS. 25F and 25G illustrate another alternative exemplary kinetic energy harvesting device 570 in accordance with one or more embodiments. The device 570 also includes a plurality of tubes 502 of the type shown in FIGS. 25A-25D. Each tube 502 has multiple fixed coils 508, and a magnet 510 moves back and forth through the tube 502 to generate electric energy in the coils, as previously discussed.

The tubes 502 in the device 570 are arranged in a circular pattern in a drum-like assembly 578. The tube assembly 578 is arranged to rotate around the center of the drum's horizontal axes relative to two opposite end plates 572 and 574. The magnet 510 inside each tube 502 moves freely side to side as the tube assembly 578 rotates. Two levitation magnets 576, 577 are positioned in fixed locations, each on one of the end plates 574, 572, respectively.

One levitation magnet 576 is located at the top left end of the plate 574, and the other levitation magnet 577 is located at the bottom right of the plate 572. The levitation magnets are 576, 577 oriented to have reversed polarization to the north south polarization of the tube magnets 510.

As the tube assembly 578 rotates on its horizontal axis, it moves each tube 502 past the fixed levitation magnets 576, 577 on opposite sides of the tubes 502.

The bottom right levitation magnet 577 will force the tube magnet 510 to the left end of its tubular path. As the drum assembly 578 rotates further, the tube magnet 510 previously moved left is now repelled by the top left levitation magnet 576 to move to its right end of the tube 502. In this way, the magnets 510 in the tubes 502 will move back and forth in the tubes 502 as the drum assembly 578 rotates. The rotation of the drum assembly 578 can be powered by wind energy, the torque energy of a windup mechanism similar to those described above, or by the force of gravity from dropping a weight. The design is very scalable and can be used to build very small multiphase rotary electric generators producing 1-5 watts for charging mobile devices or large devices generating 100 Watts or more to change EV-batteries.

Figure 25H:
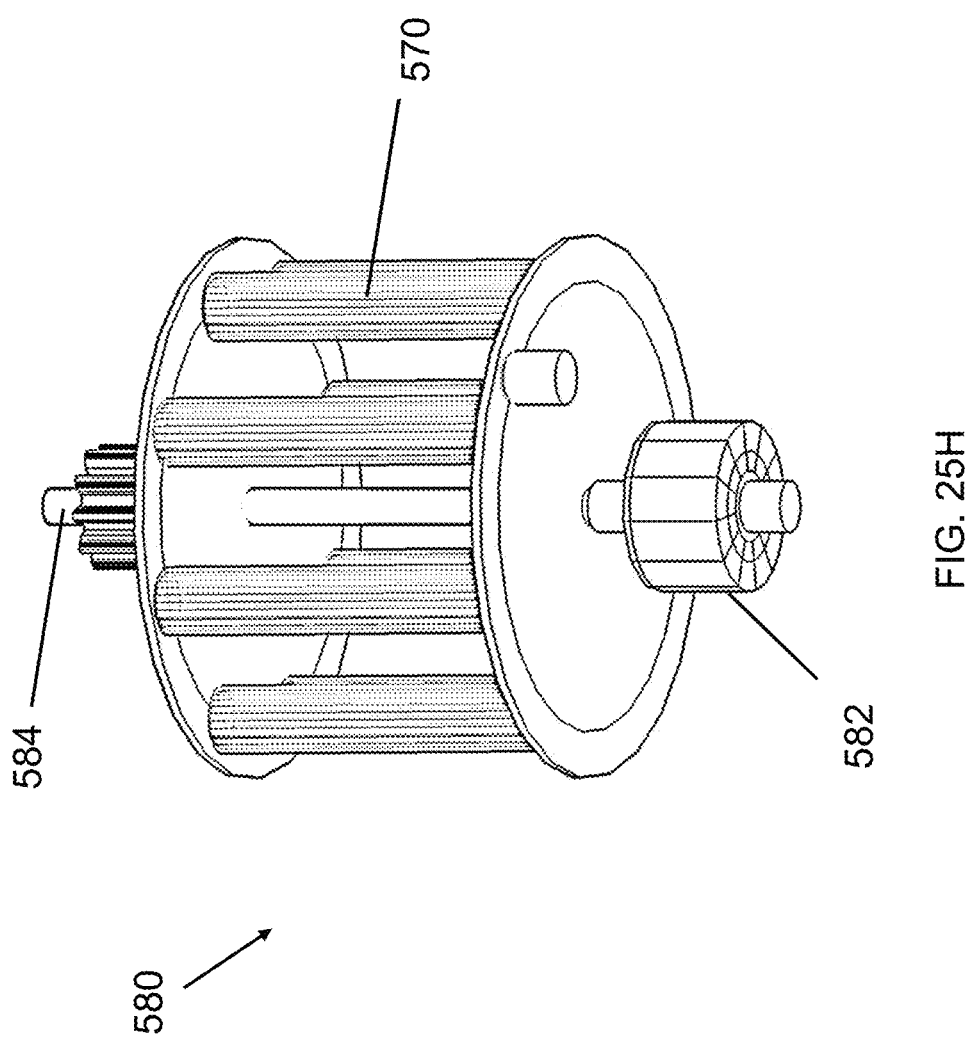
FIGS. 25H and 25I illustrate an exemplary kinetic energy harvesting device assembly including a commutator in accordance with one or more embodiments.
Figure 25I:
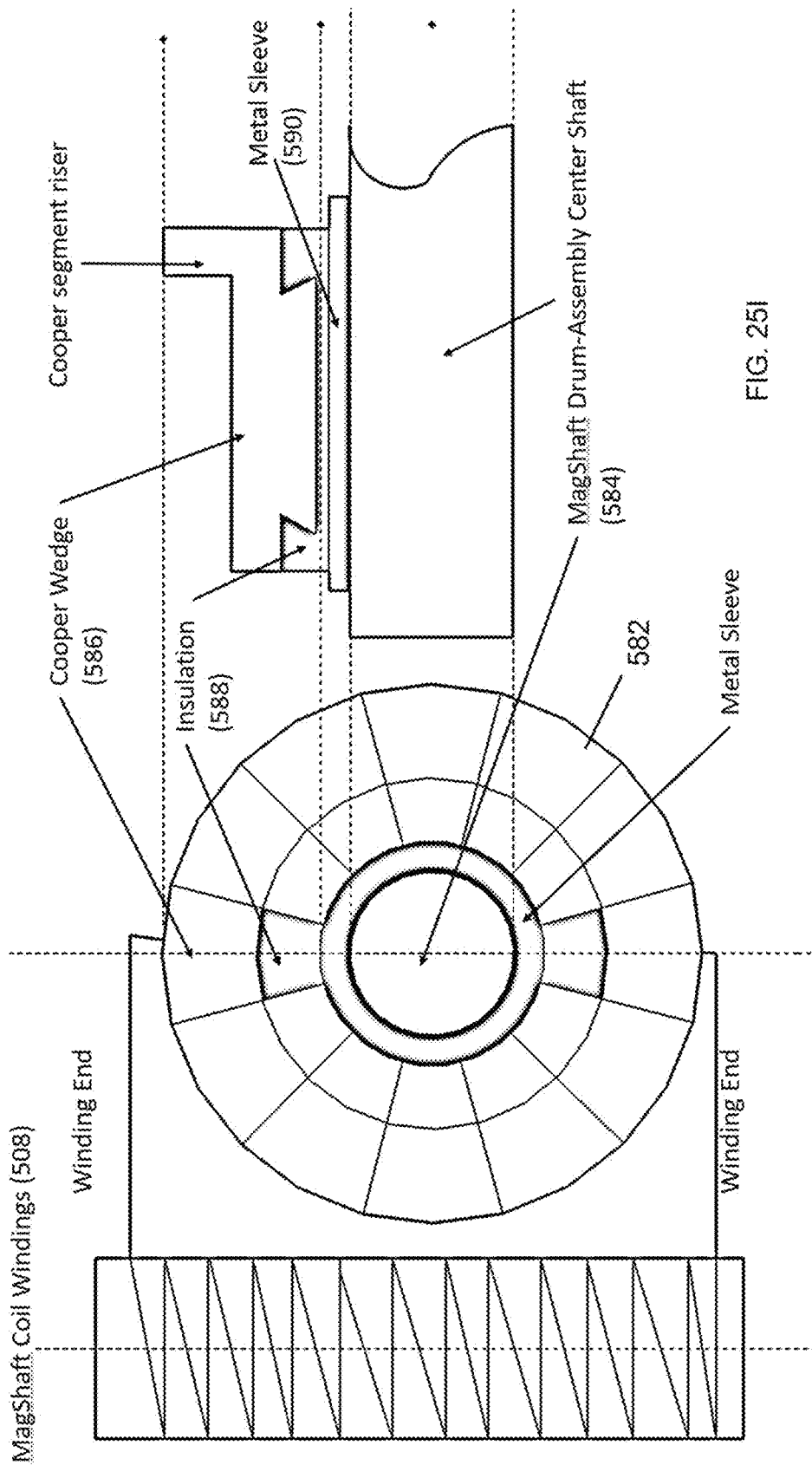

FIGS. 25H and 25I illustrate an exemplary kinetic energy harvesting device assembly 580 in accordance with one or more embodiments, which includes the device 570 of FIGS. 25F and 25G along with a commutator 582 of a generator. The coil endings of each of the tubes 502 of the device 570 are connected to a dedicated segment in the contact ring of the commutator 582.

The commutator 502, which rotates with the Drum-Assembly 570, is cylindrical in shape and is made from a number of wedge-shaped hard drawn copper bars or segments 586 insulated (by insulation 588) from each other and from the center shaft 584 of the Drum-Assembly 570. The segments form a ring around the shaft 584. Each commutator segment is connected to the ends of a Drum-Assembly coil 508. The side panels of the drum assembly have connecting wires imbedded to connect each coil wire end to its respective insulated segment.

A pair of electrically conducting brushes are positioned to be in sync to make connection each time its coil produces inductive electric energy. These brushes and levitation magnets do not rotate with the Drum Assembly.

Windup Mainspring Mechanism Embodiment

Figure 26B:
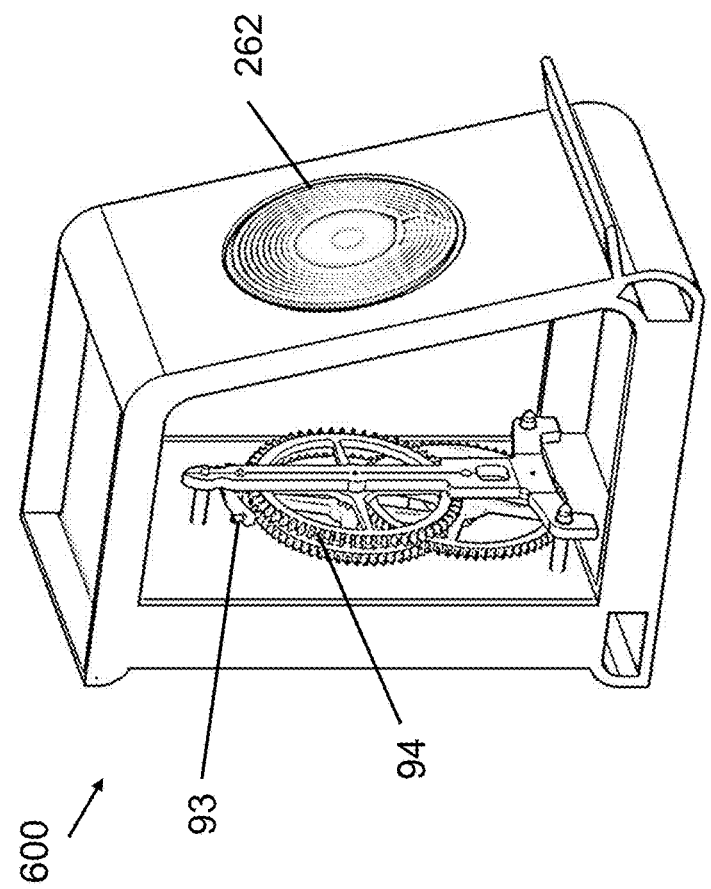
FIGS. 26A and 26B illustrate an exemplary kinetic energy harvesting device having a windup mainspring mechanism in accordance with one or more embodiments.
Figure 26A:
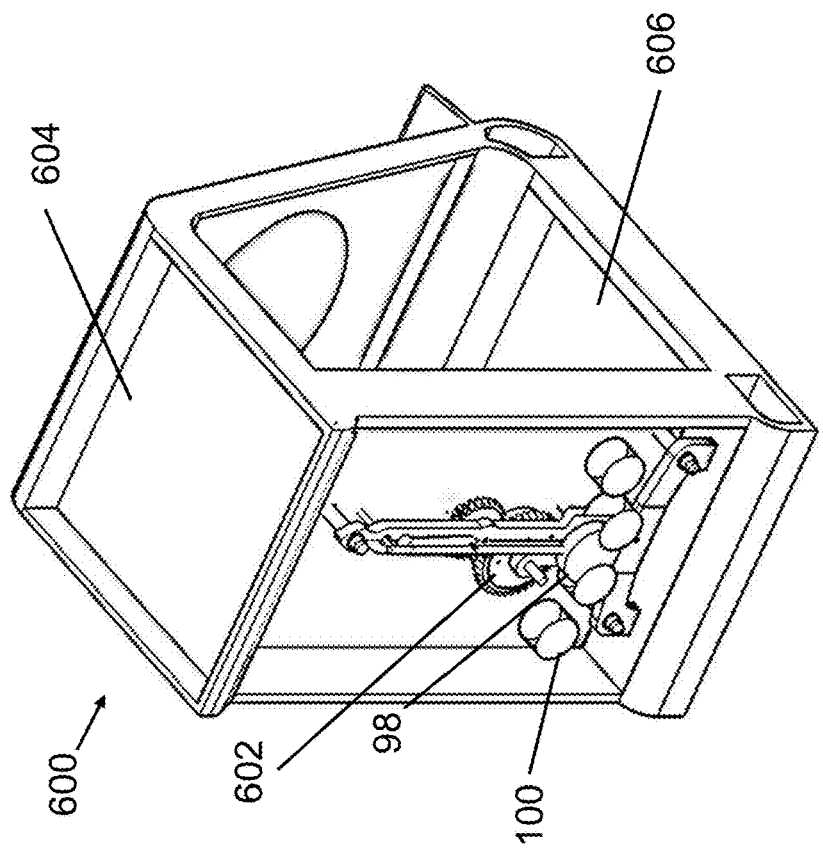

FIGS. 26A and 26B illustrate an exemplary alternate stationary device 600 for kinetic energy harvesting in accordance with one or more embodiments. The FIGS. 26A and 26B embodiment is similar to the FIGS. 24A and 24B embodiment, except that the kinetic power source is a mainspring mechanism 602 having a spiral torsion spring of metal ribbon (e.g., spring steel) similar to mechanisms used in windup clocks. Winding the mechanism, by turning a knob connected to the spring, stores energy in the mainspring by twisting the spiral tighter. The force of the mainspring is then converted to rotational torque. The mainspring mechanism turns the device's gear train as it unwinds, driving the escapement wheel.

The escapement-yoke 93 at the center of the pendulum top is notched by the timing notches of the timing wheel 94. The pendulum swings move the coil 98 at the bottom of the pendulum between multiple magnets 100. The magnet pairs 100 are spaced to leave a gap for the coil 98 to swing through. Electric energy is generated each time the winding of the coil 98 breaks the magnetic field of magnet pairs 100 in its path.

The device 600 converts the force of the expanding steel coil inside the windup mainspring mechanism 602 into electric energy. This mainspring mechanism 602 provides a constant or steady kinetic power source for a given time, e.g., 24 hours. The operation time is based on ratio of the gear train and the 30 seconds timing of the escapement wheel 94 and escapement rocker 93. After the steel coil has expanded, the user will need to wind up the steel coil to arm the mantle clock drive again.

The top and bottom spaces 604, 606 in the housing of the device 600 are configured to hold the power management electronics described above. The front of the housing holds a wireless charge transmitter coil 262. The wireless charge interface is compliant with Qi wireless charge standards as previously discussed.

Gravity Powered Alternator Embodiment

FIGS. 27A-27C illustrate an exemplary alternate stationary device 700 for kinetic energy harvesting in accordance with one or more embodiments. FIG. 27A illustrates the device 700, and FIGS. 27B and 27C show enlarged views of portions of the device 700. The device 700 uses the force of gravity applied by a weight 702 to drive an alternator 703 (e.g., a conventional automotive alternator) to generate 100 watts of energy in this example. The downward force of gravity weight 702 is converted by a set of gears 704 and a flywheel 706 into a constant high-speed rotational motion. The torque and rotational speed is adjustable by selecting particular gear ratios. The size and diameter of the flywheel 706 control the speed of a drive shaft 708 and a drive belt speed 710. The device 700 can be sized and configured to charge large capacity electric vehicle (EV) battery cells overnight. The generator 100-Watt power source can charge the EV battery cells via a generation 1 compliant charge port. The power management system can comprise a high current diode bridge found in any typical automotive alternator. The DC voltage is converted to 110 Volts AC or 220 Volts AC required by the generation 1 EV-Charge port on the vehicles.

The weight 702 can be raised by a user with a hand crank handle 712 at the front of the device 700. The weight 702 is preferably modular in design and can be loaded in increments of, e.g., 20 pounds.

Alternate Windup Mainspring Mechanism Embodiment

FIGS. 28A and 28B illustrate an exemplary alternate stationary device 800 for kinetic energy harvesting in accordance with one or more embodiments. The FIGS. 28A and 28B embodiment is similar to the FIGS. 26A and 26B embodiment except that the mainspring mechanism 602 in the FIGS. 28A and 28B embodiment does not drive a pendulum mechanism. Instead, the mainspring mechanism 602 drives a small DC generator 802 as the spring unwinds.

The force of the expanding steel coil inside the mainspring mechanism 602 provides a constant or steady kinetic power source for a given period of time, e.g., 24 hours. The operation time is based on ratio of the gear train transmission of powering a flywheel 760. After the steel coil has expanded, the user will need to wind up the steel coil to arm the mantle clock drive again. The DC generator 802 in this example is capable of generating 5-10 watts of electric energy at 9-12 Volts constant voltage.

The top and bottom spaces 604, 606 in the housing of the device 800 are configured to hold the power management electronics described above. The front of the housing holds a wireless charge transmitter coil 262. The wireless charge interface is compliant with Qi wireless charge standards as previously discussed.

Figure 29:
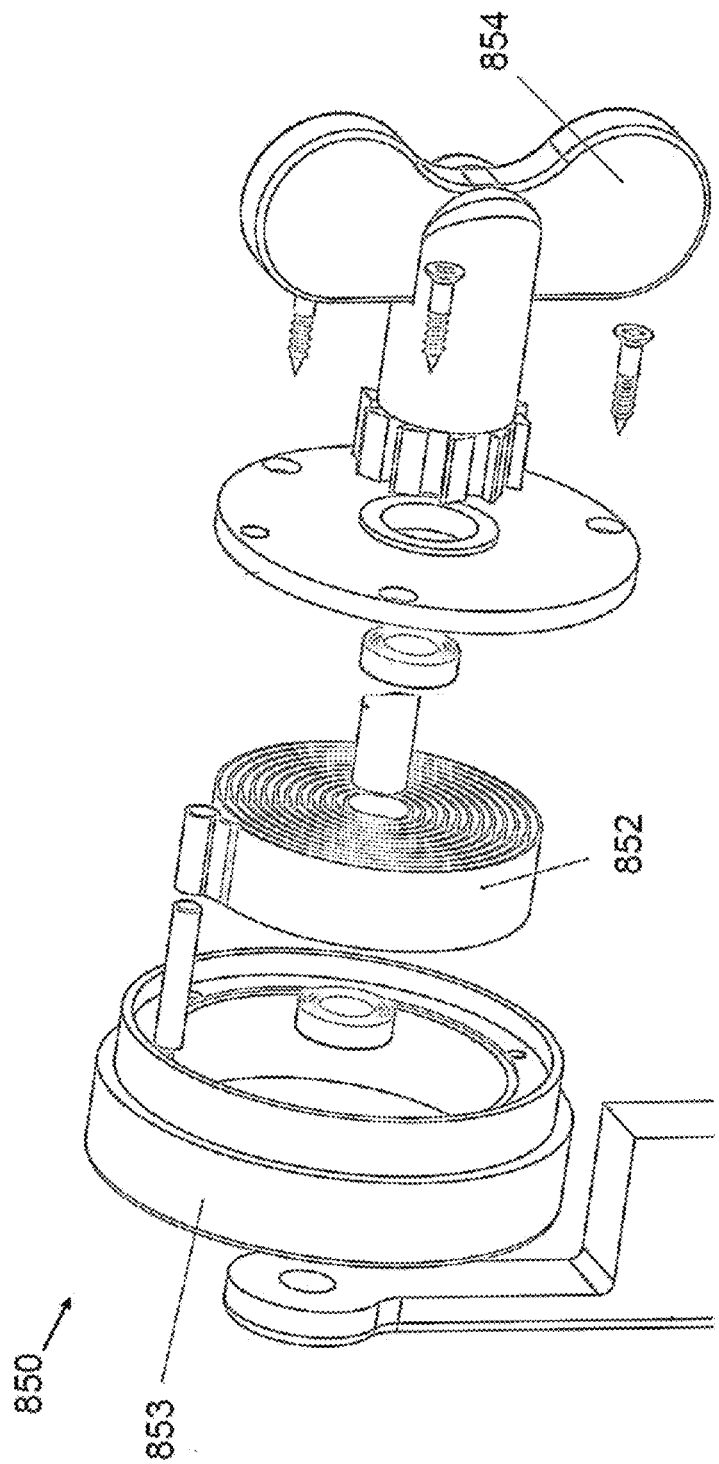
FIG. 29 is an exploded view of an exemplary windup mainspring mechanism in accordance with one or more embodiments.

FIG. 29 illustrates an exemplary windup mainspring mechanism 850 in accordance with one or more embodiments. The mechanism 850 includes a spring coil 852 in a housing 853 that can be wound up to deliverer kinetic energy to drive the shaft drum assembly 550 (FIGS. 25E-25G) as discussed below in connection with FIGS. 32A-32C. The mechanism 850 can also be used to drive other mechanisms disclosed herein to convert kinetic energy to electricity such as, e.g., a 6-volt DC mini generator. A key 854 can be used for winding the spring coil 852. The key 854 is optionally removable. Other methods of winding the coil are also possible such as, for example, a sliding button in the housing attached to one end of the coil.

One end of the spring coil is fixed to the center arbor shaft of the mechanism, which is used to wind up and tension the spring coil. The shaft is only able to turn in the winding direction; turning in the opposite turn is blocked by a ratchet. The other end of the spring coil is anchored on a pin located at an outer space of the spring coil housing. As the spring coil expands, it pushes the housing clockwise in circular motion.

Figure 30:
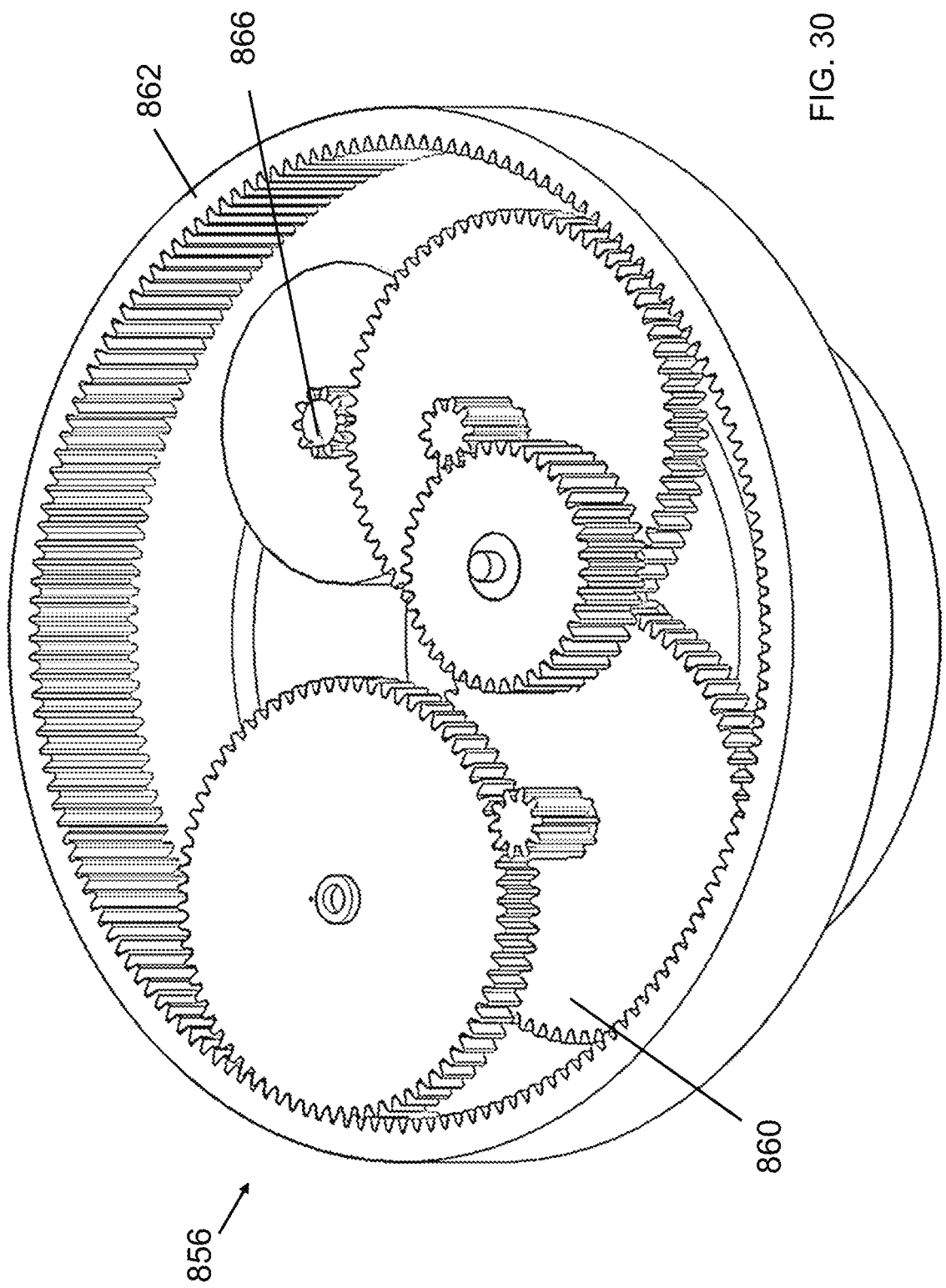
FIG. 30 is a perspective view of an exemplary gear train in accordance with one or more embodiments that can be used to transfer the torque power of a spring coil to a device for generating electric currents.

FIG. 30 shows an exemplary gear train 856 in accordance with one or more embodiments that can be used to transfer the high torque power of the spring coil 852 to the center shaft of the drum assembly 550 or DC generator. The transmission ratio between spring coil mechanism 850 and drum assembly 550 or DC generator can be set to drive the drum assembly 550 or DC generator for a specified time, e.g., two hours. In one or more embodiments, an energy-harvesting device using spring coil 852 can be designed to deliver approximately 5 Watts of electrical energy at a constant voltage level of 5.1 volts to charge the most common smart phones with one windup event of the spring coil 850. The windup mainspring mechanism 850 can be suitably sized and scaled to fit in a given harvesting device. The device can be scaled or suitably configured to meet any power requirements of devices to be charged.

The torque force of the spring coil drive 850 drives the outer gear 862, which through a series of gears drives the center shaft of the magnet shaft drum assembly 550 or DC generator. The flat design of this transmission gearbox fits into a small flat space. One rotation of the planet gear 862 will cause the pinion gear 866 on the electric generator rotate 3600 times or in short 1:3600 ratio in a very limited flat space. The gear train enables a high rotational speed of the pinion gear 866 driving the electricity generator. The integrated gear design features an internal gear integrated into the windup mechanism housing. The number of gear combinations and ratios can be modified to optimize torque to rotational speed transition of the force to the pinion gear attached to the DC generator integrated in to the same housing.

Figure 31:
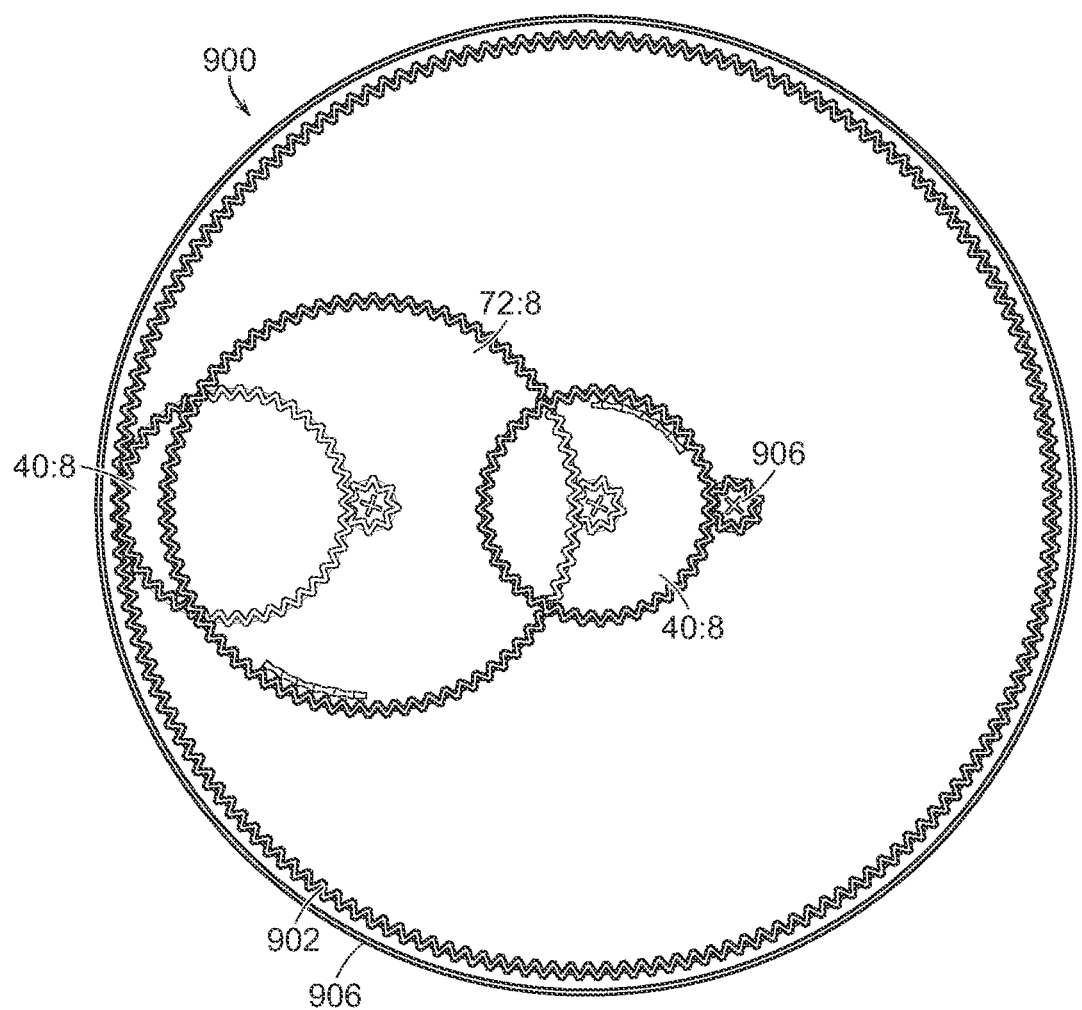
FIG. 31 illustrates an alternate gear train design in accordance with one or more embodiments.

FIG. 31 illustrates an alternate gear train design 900 in accordance with one or more embodiments. In this design, a large gear 902 with 164 inner gear teeth is directly attached to the housing 906 of the windup mechanism. As the spiral coil spring of the windup mechanism unwinds, it turns the outer shell with its imbedded 164 teeth inner gear 902. The gear combination 40:8 is driven at a ratio 164:40. The next gear combination 72:8 drives the next gear combination 40:8. The 40 teeth gear of this final combo drives the 8 teeth pinon gear 906 of the DC-Generator or magnetic drum assembly. Thus, the slow rotation of fractions per minute converts the torque force of Kilograms per inch into a fast rotational motion to drive either the DC generator or the magnetic drum assembly 550 at pinion 906.

Device With Drum Assembly

Figure 32A:
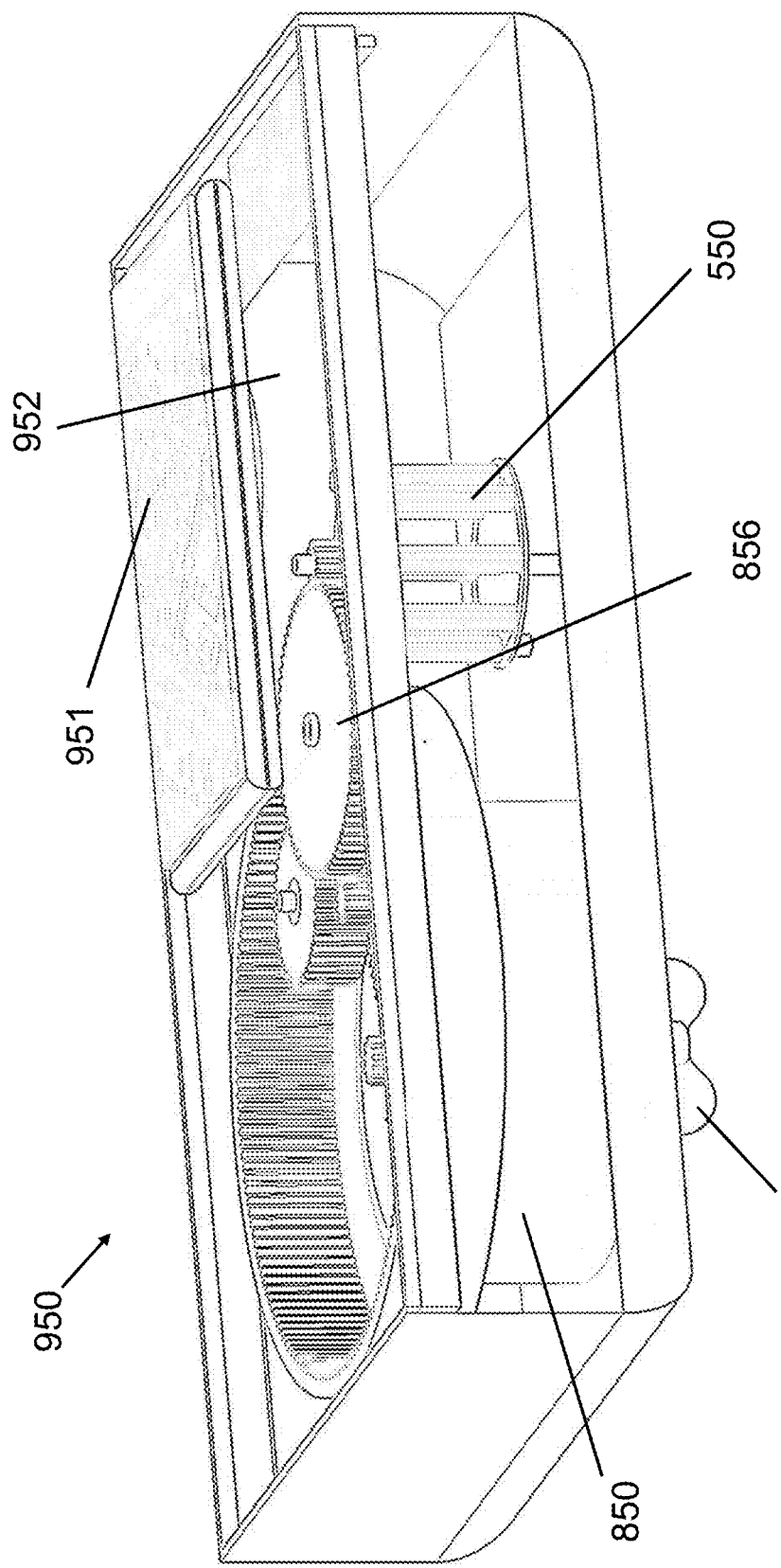

FIGS. 32A-32C illustrate an exemplary kinetic energy harvesting device 950 with a shaft drum assembly 550 in accordance with one or more further embodiments. The device 950 includes a gear train 856, windup mainspring mechanism 850, shaft drum assembly 550, and a power management system 952 similar to the power management systems previously described. The power management system 952 includes electronic circuits that convert the alternating current generated by the shaft drum assembly 550 into direct current. In one or more embodiments, the direct current has an approximately 5-watt constant flow of energy at a desired constant voltage level of 5.1 Volts. This is the voltage required to supply the flow to an industry standard USB connection 954 (shown in FIG. 32D) with the energy flow to charge a smart mobile device such as a smartphone.

The device 950 includes a Qi wireless charging interface 262 similar to the wireless charge interfaces discussed above in connection with FIGS. 20A-20C and 21 for charging a smart mobile device such as a smartphone 951. The wireless charge interface 262 can include a MagSafe or similar feature including a ring magnet 953, which enables a magnetic coupling of the smartphone 951 to the charging surface of the device 950.

Device With DC Generator

Figure 32D:
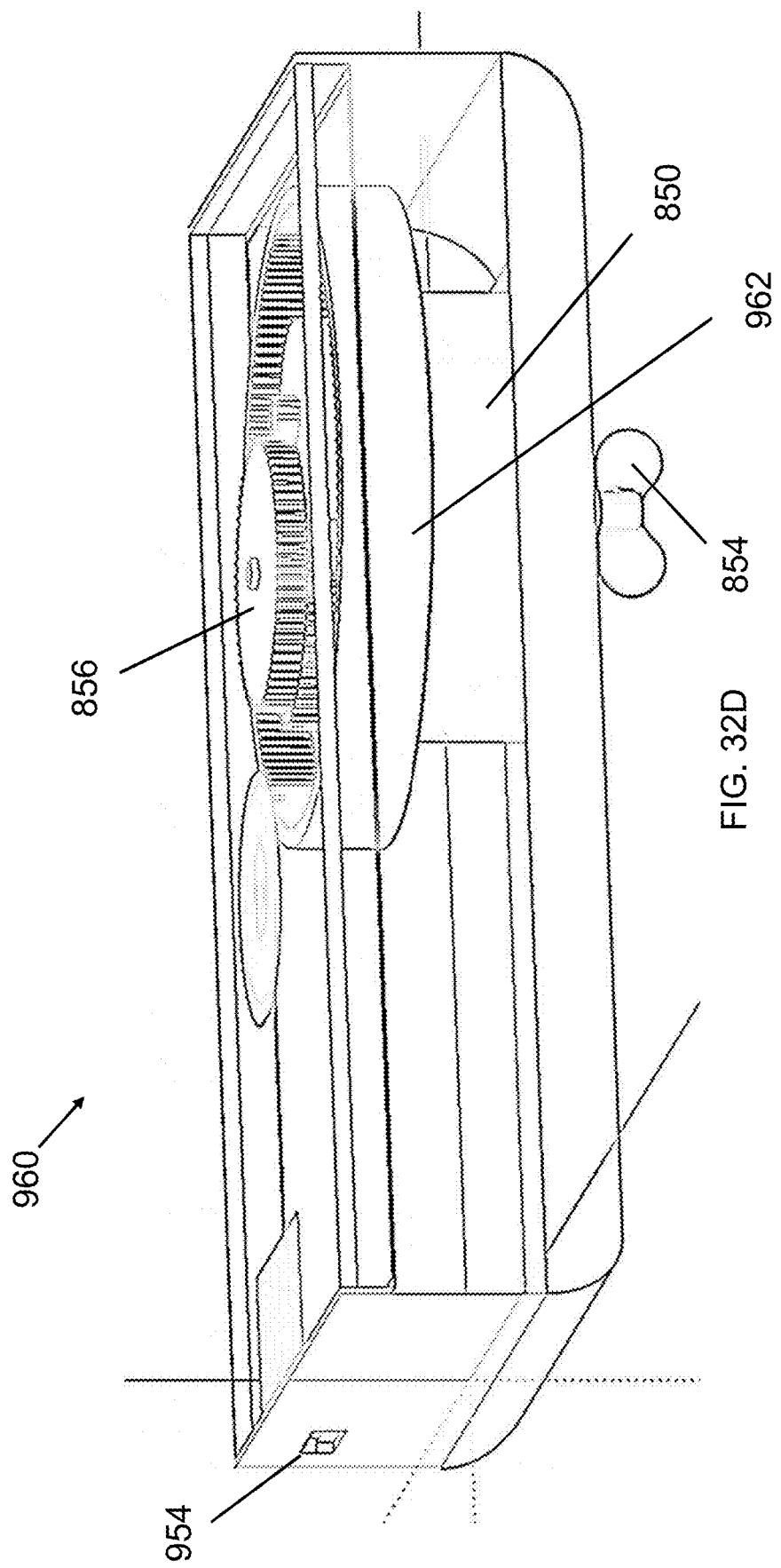

FIGS. 32D-32F illustrate an exemplary kinetic energy harvesting device 960 similar to the device 950 of FIGS. 32A-32C, except that the device 960 includes a DC generator 962 instead of a shaft drum assembly 550. In this exemplary embodiment, the DC generator 962, gear train 856, and the windup mechanism 850 are integrated in a single compact assembly.

Foldable Charging Device

FIGS. 33A-33C illustrate an exemplary stationary kinetic energy harvesting device 970 in accordance with one or more embodiments. The device 970 comprises multiple hinged sections (a base section 972, a middle section 974, and a top section 976). The device 970 can be unfolded from a flat configuration (FIG. 33A) to a standing configuration with a base section 972 unfolded from the middle section 974 as shown in FIG. 33B and to another standing configuration with the base section 972 and the top section 976 unfolded as shown in FIG. 33C.

The middle section 974 can include a wireless charge interface suitable for charging a device like a smartphone. The top and bottom sections 972, 976 can include wireless charge interfaces suitable for charging other user devices such as a smartwatch (e.g., an Apple Watch) or earbud headphones (e.g., Apple AirPods).

FIG. 33A shows the device 970 in a folded configuration. The device 970 can be laid on a surface and a smartphone can be placed on the middle section 974 to be charged. The device 970 can also be mobile. In the FIG. 33B configuration, the bottom section 972 of the device 970 is unfolded and forms a base, allowing the device 970 to be in an upright inclined position. The middle section 974 can be used for charging a smartphone, and the bottom section 972 can be used for charging another user device. Finally, in the FIG. 33C configuration, both the bottom section 972 and the top section 976 are unfolded, and all three sections can be used for charging a smartphone and other user devices.

In one or more alternate embodiments, the bottom, middle, and/or top sections 972, 974, 976 are fixedly connected to each other such the sections are not foldable.

In one or more alternate embodiments, the bottom, middle, and top sections 972, 974, 976 can be connected to each other by means other than a hinge. For example, the sections can be connected by a snap-fit or other connection feature. In one or more alternate embodiments, some of the sections are fixedly connected and others are rotatably connected.

The device 970 includes all the components needed for generating a charging current, including a gear train, a windup mainspring mechanism, a shaft drum assembly, and a power management system similar to such components previously described. The components can be fitted in the device 970 in various ways. For instance, the middle section 974 can accommodate the windup mainspring mechanism and the shaft drum assembly. The size of the device, including the depth of the middle section 974, can be adjusted to accommodate the size of the windup coil spring and drum mechanism components. The key for the winding up the windup coil can be located on the back of the middle section and can be removable or hinged to lay flat when not in use.

The wireless charge interface in the middle section 974 is preferably positioned at a lower end of the middle section 974 in order to accommodate horizontal and vertical placement of the smartphone on the interface. In one or more embodiments, the middle section 974 includes a MagSafe or similar feature, which enables a magnetic coupling of the device to be charged to the middle section 974. If the middle section 974 does not include a MagSafe or similar feature, the device to be charged can be securely positioned on the middle section 974 using a bottom support bracket 978.

In one or more alternate embodiments, if the device to be charged has wireless charging capability, but does not include a MagSafe magnet feature, a suitable magnet accessory can be attached to the rear of the device, e.g., using an adhesive. Such an accessory will allow the device to take advantage of the catch and hold in place MagSafe feature in combination with a Qi wireless charging interface.

In one or more alternate embodiments, the device 970 only comprises the middle section 974 (i.e., there are not foldable sections 972 and 976). In this embodiment, the device is able to charge a single user device like a smartphone. In one or more further alternate embodiments, the device 970 only comprises the middle section 974 and the bottom section 972 (i.e., there is no upper sections 976). In this embodiment, the device is able to charge a single user device like a smartphone and an additional user device.

All of the devices disclosed herein featuring wireless charging can also include a USB or other wired interface to allow charging devices not supporting wireless charging.

Figure 34:
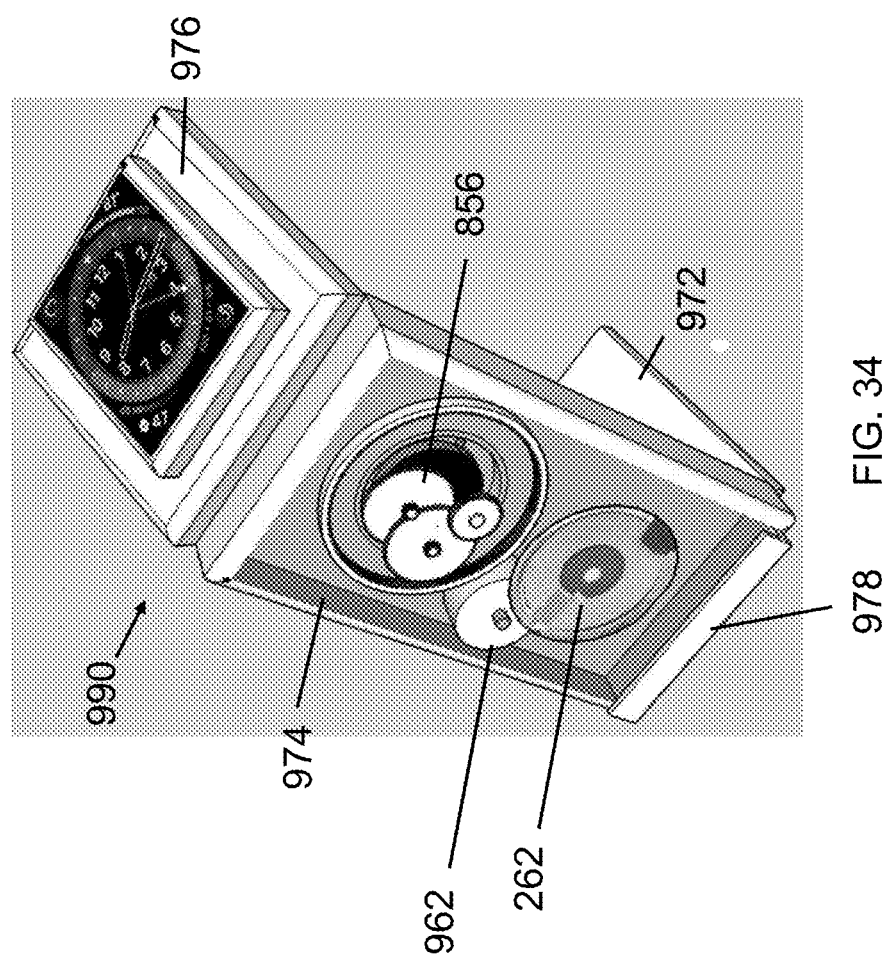
FIG. 34 illustrates an exemplary stationary kinetic energy harvesting device in accordance with one or more embodiments.

FIG. 34 illustrates an exemplary stationary kinetic energy harvesting device 990 similar to the device 970 of FIGS. 33A-33C. FIG. 34 illustrates the internal components of the device including the gear train 856, DC generator 962, and charge interface 262.

The devices disclosed herein utilize various sources of kinetic energy, including kinetic energy resulting from movement of the device (e.g., FIGS. 1A, 1B, 2, 3, 4A, 4B, 5-9, 10A, 10B, 15, 16, 17, 18, 19A, 19B, 22, 25), movement of a falling weight in the device (e.g., FIGS. 11A-11C, 24A, 24B, 27), movement resulting from uncoiling of a windup mechanism (e.g., FIGS. 28A, 28B, 29, 32A-32F, 33A-33C, and 34). The devices also disclose different mechanisms for generating electricity from the kinetic energy including, e.g., various coil/magnet devices (e.g., FIGS. 1A, 1B, 2, 3, 4A, 4B, 5-9, 10A, 10B, 15, 16, 17, 18, 19A, 19B, 22, 24A, 24B, 25A-25D, 26) and alternators or DC generators (e.g., FIGS. 27, 28, 33). It is contemplated that any one of the different sources of kinetic energy can be used with any one of the different mechanisms for generating electricity from the kinetic energy. Furthermore, the power management systems and the wired and wireless charging interfaces can be incorporated in any of the different types of devices disclosed herein. The power management systems may or may not have a battery included in the device. In some embodiments, the power management systems directly charge devices through wired or wireless connections. In other embodiments, the power management systems charge an internal battery, which then powers the devices to be charged.

Having thus described several illustrative embodiments, it is to be appreciated that various alterations, modifications, and improvements will readily occur to those skilled in the art. Such alterations, modifications, and improvements are intended to form a part of this disclosure and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

Accordingly, the foregoing description and attached drawings are by way of example only and are not intended to be limiting.

The invention claimed is:

1. An apparatus for converting kinetic energy to electrical energy, comprising:
   a housing;
   a device for converting kinetic energy to electrical energy in the housing;
   a windup mainspring mechanism in the housing for driving the device for converting kinetic energy to electrical energy to generate an output electric current; and
   a power management system in the housing receiving the electric current from the device for converting kinetic energy to electrical energy to provide a regulated charge voltage to an external device, wherein the power management system further comprises a battery and a wired or wireless charging interface for charging the external device, wherein the power management system further comprises a wired or wireless charging interface for charging the external device, and wherein the housing comprises a first panel having the wired or wireless charging interface for charging the external device;
   wherein the housing further comprises a second panel fixedly or pivotally connected to one end of the first panel, and wherein the power management system further comprises an additional wired or wireless charging interface at the second panel for charging a second external device.

2. The apparatus of claim 1, wherein the housing further comprises a third panel fixedly or pivotally connected to another end of the first panel, and wherein the power management system further comprises a further additional wired or wireless charging interface at the third panel for charging a third external device.

3. The apparatus of claim 1, wherein the wireless charging interface includes a Qi wireless charging coil.

4. The apparatus of claim 1, wherein the wireless charging interface includes a magnet magnetically coupling with a magnet on the external device for automatic alignment of the external device on the wireless charging interface.

5. The apparatus of claim 1, wherein the wired charging interface comprises a USB port.

6. The apparatus of claim 1, wherein the windup mainspring mechanism comprises a spiral torsion spring of metal ribbon that stores energy when the spiral torsion spring is wound.

7. The apparatus of claim 1, further including a gear train comprising a set of gears driven by rotational energy from the windup mainspring mechanism and transferring the rotational energy to the device for converting kinetic energy to electrical energy.

8. The apparatus of claim 7, further comprising a flywheel connected to the gear train.

9. The apparatus of claim 7, wherein device for converting kinetic energy to electrical energy, the gear train, and the windup mainspring mechanism are integrated in a single compact assembly.

10. The apparatus of claim 1, wherein the device for converting kinetic energy to electrical energy comprises a direct current generator.

11. The apparatus of claim 1, wherein the device for converting kinetic energy to electrical energy includes:
   a tube assembly comprising a plurality of tubes arranged in a circle, each tube having one or more wire coils fixedly positioned therein and a magnet movably positioned inside the tube for back and forth movement from one end of the tube to an opposite end such that the movement of the magnet past each of the one or more wire coils generates an alternating current in the wire coil;
   two end plates, each end plate being positioned on an opposite side of the tube assembly such that the tube assembly can rotate relative to the end plates, each end plate having a levitation magnet fixedly positioned thereon and oriented to repel the magnets in the plurality of tubes to promote movement of the magnets in the tubes as each tube moves past the levitation magnet; and
   a circuit electrically connected to the wire coils, said circuit including a rectifier to convert the alternating current generated in the wire coils into direct current.

12. The apparatus of claim 1, wherein the device for converting kinetic energy to electrical energy includes:
   a plurality of magnets fixed at spaced-apart locations in the housing defining a path;
   a pendulum mechanism comprises a pivotally mounted shaft having a first end and a second end;
   a wire coil connected to the second end of the shaft such that it is movably positioned in the housing for back and forth swinging movement along the path such that the movement of the wire coil through magnetic fields of the plurality of magnets generates an alternating current in the wire coil;
   a reverse escapement mechanism connected to the first end of the shaft for driving the pendulum mechanism; and
   a circuit electrically connected to the wire coil including a rectifier to convert the alternating current generated in the wire coil into direct current.

13. An apparatus for converting kinetic energy to electrical energy, comprising:
   a housing;
   a device for converting kinetic energy to electrical energy in the housing, wherein the device for converting kinetic energy to electrical energy includes: (a) a tube assembly comprising a plurality of tubes arranged in a circle, each tube having one or more wire coils fixedly positioned therein and a magnet movably positioned inside the tube for back and forth movement from one end of the tube to an opposite end such that the movement of the magnet past each of the one or more wire coils generates an alternating current in the wire coil; (b) two end plates, each end plate being positioned on an opposite side of the tube assembly such that the tube assembly can rotate relative to the end plates, each end plate having a levitation magnet fixedly positioned thereon and oriented to repel the magnets in the plurality of tubes to promote movement of the magnets in the tubes as each tube moves past the levitation magnet; and (c) a circuit electrically connected to the wire coils, said circuit including a rectifier to convert the alternating current generated in the wire coils into direct current;
   a windup mainspring mechanism in the housing for driving the device for converting kinetic energy to electrical energy to generate an output electric current; and
   a power management system in the housing receiving the electric current from the device for converting kinetic energy to electrical energy to provide a regulated charge voltage to an external device.

14. An apparatus for converting kinetic energy to electrical energy, comprising:
- a housing;
- a device for converting kinetic energy to electrical energy in the housing, wherein the device for converting kinetic energy to electrical energy includes: (a) a plurality of magnets fixed at spaced-apart locations in the housing defining a path; (b) a pendulum mechanism comprises a pivotally mounted shaft having a first end and a second end; (c) a wire coil connected to the second end of the shaft such that it is movably positioned in the housing for back and forth swinging movement along the path such that the movement of the wire coil through magnetic fields of the plurality of magnets generates an alternating current in the wire coil; (d) a reverse escapement mechanism connected to the first end of the shaft for driving the pendulum mechanism; and (e) a circuit electrically connected to the wire coil including a rectifier to convert the alternating current generated in the wire coil into direct current;
- a windup mainspring mechanism in the housing for driving the device for converting kinetic energy to electrical energy to generate an output electric current; and
- a power management system in the housing receiving the electric current from the device for converting kinetic energy to electrical energy to provide a regulated charge voltage to an external device.

* * * * *